US012452251B2

(12) United States Patent
Smyth et al.

(10) Patent No.: US 12,452,251 B2
(45) Date of Patent: Oct. 21, 2025

(54) SYSTEM AND METHOD FOR ELECTRONIC IDENTITY AND ACCESS MANAGEMENT

(71) Applicant: ROYAL BANK OF CANADA, Toronto (CA)

(72) Inventors: Cathal Smyth, Toronto (CA); Amit Kumar Tiwari, Toronto (CA); Venkata Sai Pavan Kumar Kosaraju, Toronto (CA); Payam Pakarha, Toronto (CA); Lindsey Peng, Toronto (CA); Bijan Borzou, Ottawa (CA); Tung-Lin Wu, Toronto (CA); Sahar Rahmani, Toronto (CA)

(73) Assignee: ROYAL BANK OF CANADA, Toronto (CA)

( * ) Notice: Subject to any disclaimer, the term of this patent is extended or adjusted under 35 U.S.C. 154(b) by 171 days.

(21) Appl. No.: 18/130,204

(22) Filed: Apr. 3, 2023

(65) Prior Publication Data

US 2023/0319055 A1    Oct. 5, 2023

Related U.S. Application Data

(60) Provisional application No. 63/326,530, filed on Apr. 1, 2022.

(51) Int. Cl.
*H04L 29/06* (2006.01)
*H04L 9/40* (2022.01)

(52) U.S. Cl.
CPC .......... *H04L 63/105* (2013.01); *H04L 63/102* (2013.01)

(58) Field of Classification Search
CPC ............................ H04L 63/105; H04L 63/102
See application file for complete search history.

(56) References Cited

U.S. PATENT DOCUMENTS

| | | | |
|---|---|---|---|
| 8,055,597 B2 * | 11/2011 | Acharya | G06F 7/00 706/45 |
| 9,135,396 B1 * | 9/2015 | Kalinin | G06F 16/9024 |
| 10,554,665 B1 * | 2/2020 | Badawy | G06F 21/45 |
| 2015/0020214 A1 * | 1/2015 | Copsey | G06F 21/6218 726/27 |
| 2015/0067889 A1 * | 3/2015 | Baikalov | G06F 21/577 726/28 |
| 2016/0352778 A1 * | 12/2016 | Chari | G06N 20/00 |
| 2019/0260752 A1 * | 8/2019 | Thexton | H04L 63/102 |
| 2023/0110080 A1 * | 4/2023 | Hen | H04L 63/105 726/4 |

* cited by examiner

*Primary Examiner* — Ka Shan Choy
(74) *Attorney, Agent, or Firm* — NORTON ROSE FULBRIGHT CANADA LLP

(57) ABSTRACT

Systems and methods for generating access entitlements to networked computing resources. Systems may be configured to: receive an input data set representing an entitlement request associated with a user identifier; generate an entitlement prediction associated with the user identifier based on an entitlement model and at least one hierarchical level, the entitlement model defining a cluster representation of entitlement similarity, and wherein the entitlement prediction is based on one or more similarity relationships corresponding to the at least one hierarchical level; and transmit a signal representing the entitlement prediction for granting downstream access to a networked computing resource.

20 Claims, 17 Drawing Sheets

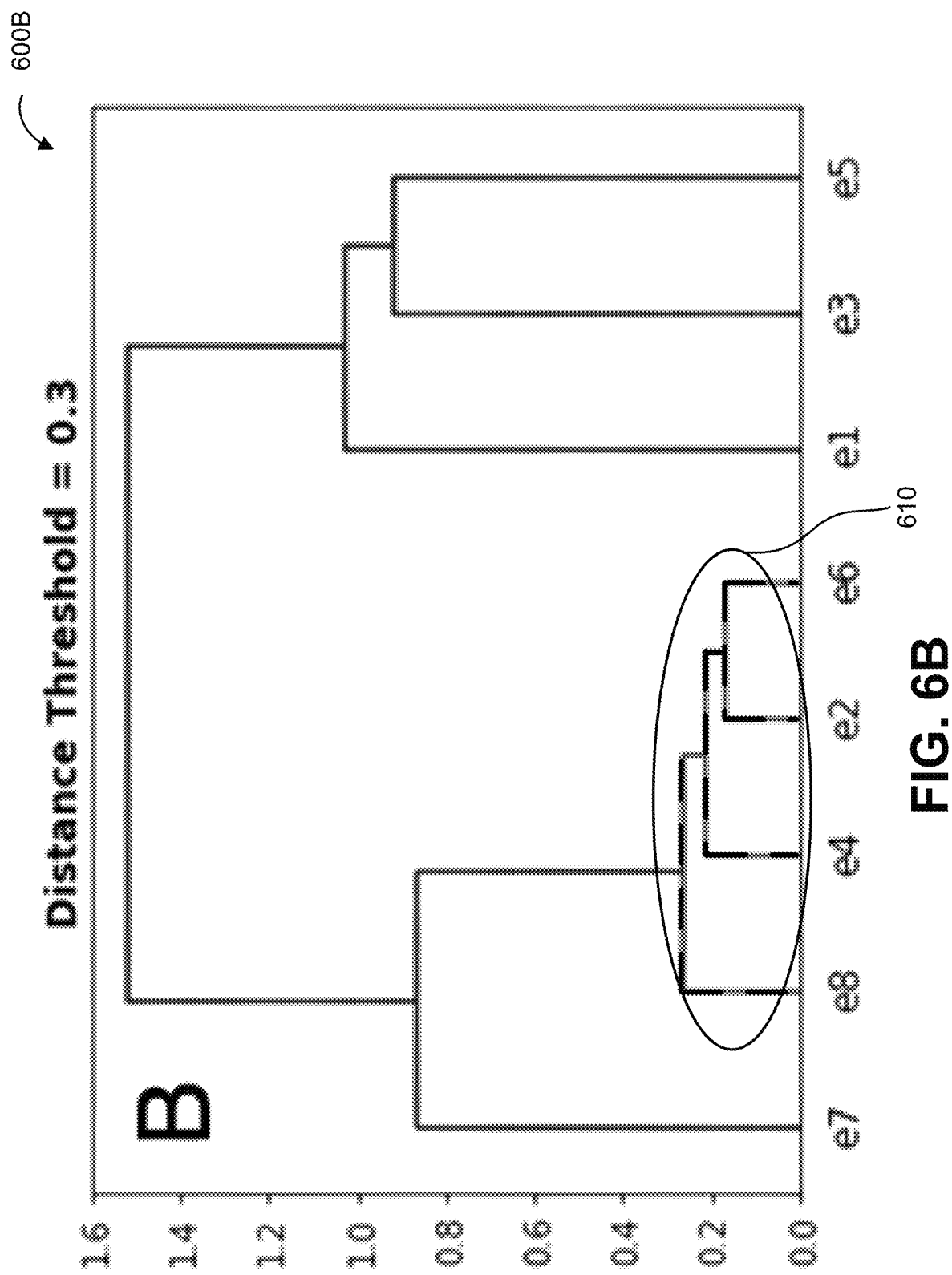

SYSTEM AND METHOD FOR ELECTRONIC IDENTITY AND ACCESS MANAGEMENT

CROSS REFERENCE TO RELATED APPLICATIONS

This application claims priority from U.S. provisional patent application No. 63/326,530, entitled "SYSTEM AND METHOD FOR ELECTRONIC IDENTITY AND ACCESS MANAGEMENT", filed on Apr. 1, 2022, the entire contents of which are hereby incorporated by reference herein.

FIELD

Embodiments of the present disclosure relate to the field of networked computing resources and, in particular to systems and methods for generating access entitlement predictions to networked computing resources.

BACKGROUND

Networked computing resources may be configured as access-controlled computing resources. Networked computing resources may be electronic mail servers, database servers, or application servers, among other example resources.

Access controls or restrictions may be based on identification of usernames or pseudonyms or client device identifications, among other examples. In some scenarios, a given username may be granted one or more entitlements associated with accessing at least one networked computing resources. For example, a given username may be associated with entitlements to access an organization's email servers for that username's mailbox, to access licensed software applications, or to access access-controlled database entries. In some scenarios, respective user names may be associated with a plurality of entitlements to access networked computing resources.

SUMMARY

The present disclosure describes embodiments of systems and methods for generating access entitlements to networked computing resources. Networked computing resources may include electronic mail servers, database servers, application servers, applications, databases, electronic mail distribution lists, among other example resources.

An organization may include a plurality of users respectively associated with entitlements to at least one networked computing resource. Entitlements may be permissions to access particular computing servers, applications, devices, or the like. For example, a given user of an organization may be associated with entitlements to access or utilize an electronic mail server and electronic mailbox associated with the user. The given user may be associated with further entitlements to access collaboration tools, such as instant-messaging applications, document management repositories and associated files stored thereon, or licensed software applications, among other examples of networked computing resources.

Embodiments of the present disclosure provide systems and methods to generate entitlements to networked computing resources for associating with user identifiers.

In some embodiments, the systems and methods may be configured to generate entitlement predictions based on entitlement requests. Entitlement requests may be associated with a new user of an organization, and the entitlement predictions may be access entitlement grants to a plurality of computing resources based on prior-determined entitlements of users that may be similar to the new user.

In some embodiments, entitlement requests may be associated with a query on whether a given entitlement for a user identifier may include an unintended or outdated entitlement assignment. In some embodiments, entitlement requests may be associated with identifying whether one or a group of user identifiers may be associated with a combination of access entitlements that may require updates.

Features of embodiments of systems and methods will be further disclosed herein.

In an aspect, the present disclosure provides a system for generating access entitlements to networked computing resources. The system includes a processor and a memory coupled to the processor. The memory may store processor-executable instructions that, when executed, configure the processor to: receive an input data set representing an entitlement request associated with a user identifier; generate an entitlement prediction associated with the user identifier based on an entitlement model and at least one hierarchical level, the entitlement model defining a cluster representation of entitlement similarity, and wherein the entitlement prediction is based on one or more similarity relationships corresponding to the at least one hierarchical level; and transmit a signal representing the entitlement prediction for granting downstream access to a networked computing resource.

In another aspect, the present disclosure provides a method for generating access entitlements to access-controlled computing resources. The method includes receiving an input data set representing an entitlement request associated with a user identifier; generating an entitlement prediction associated with the user identifier based on an entitlement model and at least one hierarchical level, the entitlement model defining a cluster representation of entitlement similarity, and wherein the entitlement prediction is based on one or more similarity relationships corresponding to the at least one hierarchical level; and transmitting a signal representing the entitlement prediction for granting downstream access to a networked computing resource.

In another aspect, a non-transitory computer-readable medium or media having stored thereon machine interpretable instructions which, when executed by a processor may, cause a processor to perform one or more methods described herein.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

BRIEF DESCRIPTION OF DRAWINGS

Embodiments will be described, by way of example only, with reference to the attached figures, wherein in the figures:

FIGS. 6A, 6B, and 6C illustrate a series of dendrograms showing attribute distances between pairs of merged clusters based on hierarchical clustering operations, in accordance with embodiments of the present disclosure;

It is understood that throughout the description and figures, like features are identified by like reference numerals.

DETAILED DESCRIPTION

Networked computing resources may be configured as access-controlled resources. Networked computing resources may include electronic mail servers, database servers, application servers, applications, databases, electronic mail distribution lists, among other example resources.

In some scenarios, systems may be configured to provide access restrictions to access-controlled computing resources based on identification of usernames, pseudonyms, or client device identifications, among other examples.

An organization may include a plurality of users respectively associated with entitlements to at least one networked computing resource. Entitlements may be permissions to access particular computing servers, applications, devices, or the like. For example, a given user of an organization may be associated with entitlements to access or utilize an electronic mail server and electronic mailbox associated with the user. The given user may be associated with further entitlements to access collaboration tools, such as instant-messaging applications, document management repositories and associated files stored thereon, or licensed software applications, among other examples of networked computing resources.

In some scenarios, a given organization may include a large number of users, and respective users may be associated with various data sets of entitlements. In some scenarios, it may be desirable to conduct operations to periodically scrutinize or audit entitlement sets associated with a plurality of users within an organization. In some embodiments, scrutinizing entitlements associated with a plurality of users may include operations to quantify a likelihood that the respective entitlements are substantially similar to entitlements of other similar users, or to quantify a likelihood that the respective entitlements are not unintended entitlement assignments.

In some scenarios, conducting such operations to scrutinize entitlement data sets may be a meticulous, time-consuming set of operations at least because there may be numerous combinations of entitlements associated with users. It may be desirable to provide systems and methods for generating access entitlement predictions to networked computing resources based on modelled role categories. It may further be desirable to provide systems and methods for generating attestation values to be associated with user (identity)—entitlement data sets for identifying entitlement data sets that may be anomalous. Anomalous access entitlements may include entitlements that may be inadvertently or unintendedly assigned to users.

Figure 1:
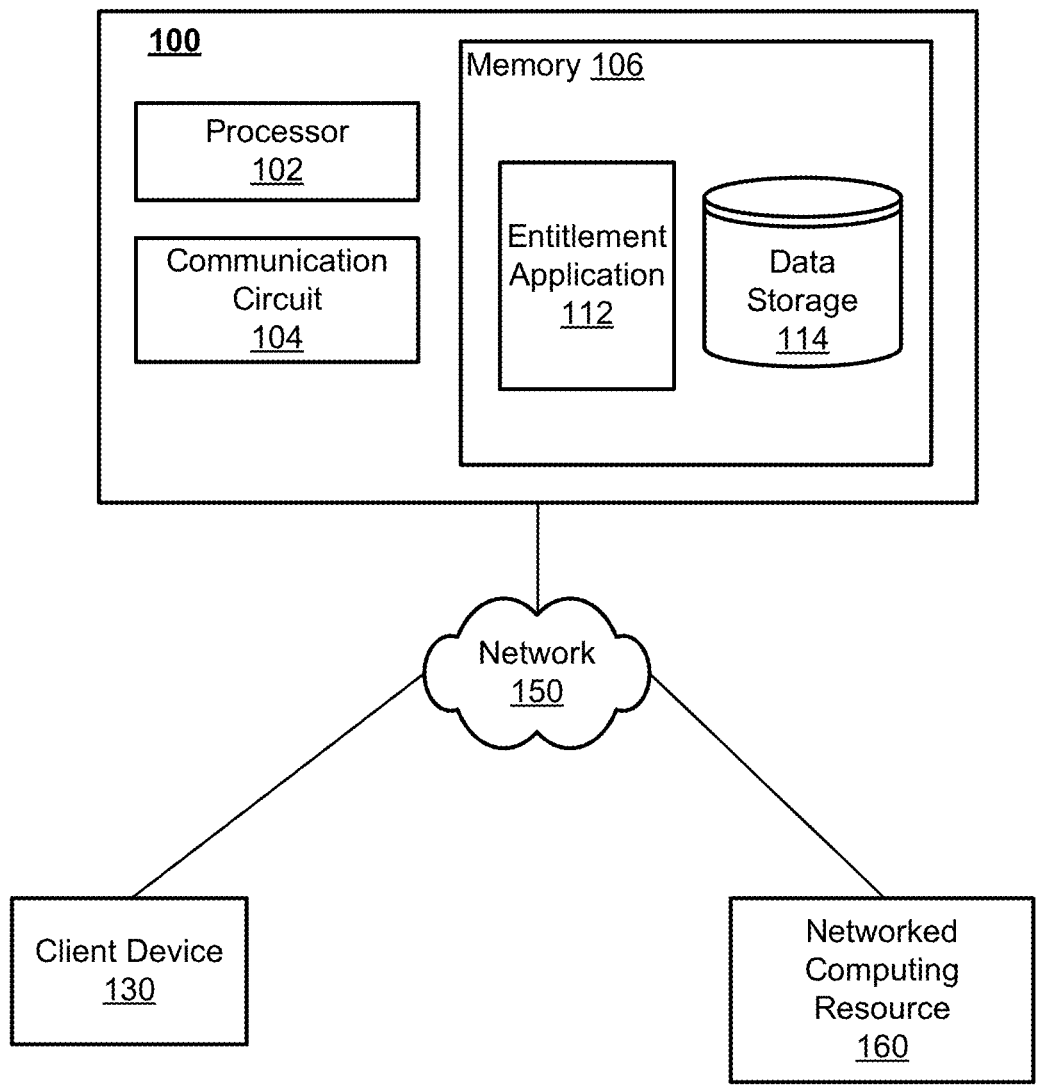
FIG. 1 illustrates a block diagram of a system, in accordance with embodiments of the present disclosure.

Reference is made to FIG. 1, which illustrates a block diagram of a system 100, in accordance with embodiments of the present disclosure. The system 100 may be associated with an organization having a plurality of users or client devices, and the system 100 may be configured to conduct operations for predicting access entitlements to networked computing resources or for generating attestation values associated with access entitlements for identifying anomalous entitlement data sets. Other operations will be described in the present disclosure.

The system 100 may transmit or receive data messages via a network 150 to or from a client device 130 or a networked computing resource 160. A sole client device 130 and a sole networked computing resource 160 are illustrated in FIG. 1; however, it may be understood that any number of client devices or networked computing resources may transmit or receive data messages to or from the system 100. In some embodiments, the system 100 may include or be the networked computing resources.

In some embodiments, the client device 130 may be a smartphone device, a portable computing device (e.g., laptop computer, tablet computing device, etc.), or a desktop computing system. The client device 130 may be operated by a user entity, and may be used for accessing the networked computing resource 160. In some embodiments, the networked computing resources may be an electronic mail server, database server, or application server, among other example resources.

In some embodiments, the client device 130 may be associated with access entitlements to the computing resources, such as access to or utilization of an electronic mail server or electronic mailbox associated with the user. In some examples, the client device 130 may be associated with access entitlements for accessing collaboration tools, such as instant-messaging applications, document management repositories and associated files stored thereon, or licensed software applications, among other examples. In some examples, the client device 130 may be associated with access entitlements for defining whether the given user may read and/or write to particular files storied on document management repositories, or whether the given user may otherwise access resources.

In some embodiments, the client device 130 may be configured to transmit a proposed access entitlement data set to the system 100 for obtaining approvals for the proposed access entitlements to networked computing resources. In some embodiments described in the present disclosure, the system 100 may conduct operations for scrutinizing or auditing the proposed access entitlements or existing access entitlements for identifying potentially anomalous access entitlements to networked computing resources.

In some embodiments, the networked computing resource 160 may be the electronic mail server, database server, document management server, remotely-hosted applications, among other example resources that may be access-controlled.

The system may include a processor 102 configured to implement processor-readable instructions that, when executed, configure the processor 102 to conduct operations described in the present disclosure.

In some examples, the processor 102 may be a microprocessor or microcontroller, a digital signal processing processor, an integrated circuit, a field programmable gate array, a reconfigurable processor, or combinations thereof. In some embodiments, the processor 102 may be a combination of a central processing unit and an application specific integrated circuit (e.g., a graphics processing unit).

The system 100 includes a communication circuit 104 configured to transmit or receive data messages to or from other computing devices, to access or connect to network resources, or to perform other computing applications by connecting to a network (or multiple networks) capable of carrying data.

The network 150 may include a wired or wireless wide area network (WAN), local area network (LAN), a combination thereof, or other networks for carrying telecommunication signals. In some embodiments, network communications may be based on HTTP post requests or TCP connections. Other network communication operations or protocols may be contemplated.

In some embodiments, the network 150 may include the Internet, Ethernet, plain old telephone service line, public switch telephone network, integrated services digital network, digital subscriber line, coaxial cable, fiber optics, satellite, mobile, wireless, SS7 signaling network, fixed line, local area network, wide area network, or other networks, including one or more combination of the networks. In some examples, the communication circuit 104 may include one or more busses, interconnects, wires, circuits, or other types of communication circuits. The communication circuit 104 may provide an interface for communicating data between components of a single device or circuit.

The system 100 includes memory 106. The memory 106 may include one or a combination of computer memory, such as random-access memory, read-only memory, electro-optical memory, magneto-optical memory, erasable programmable read-only memory, and electrically-erasable programmable read-only memory, ferroelectric random-access memory, or the like. In some embodiments, the memory 106 may be storage media, such as hard disk drives, solid state drives, optical drives, or other types of memory.

The memory 106 may include an entitlement application 112 including processor-executable instructions for conducting operations described in the present disclosure. In some examples, the entitlement application 112 may include operations for providing client devices or identified users with access to access-controlled computing resources based on identification of usernames, pseudonyms, or other client device identifiers, among other examples.

In some embodiments, the entitlement application 112 may include processor-readable instructions for conducting operations of models for generating access entitlement predictions to networked computing resources based on modelled role categories. In some embodiments, the entitlement application 112 may include processor-readable instructions for generating attestation values to be associated with user entitlement data sets for identifying entitlement data sets that may be anomalous. Other embodiments of operations will be described in the present disclosure.

The system 100 includes data storage 114. In some embodiments, the data storage 114 may be a data store, including a secure data store. In some embodiments, the data storage 114 may store data sets representing access entitlements associated with one or more computing resources for a plurality of users or identities. The access entitlement data sets may be received from at least one of the client device 130 or the networked computing resource 160. In some embodiments, the data store may include resources associated with the networked computing resource 160, such as access-controlled data sets, licensed software applications, among other examples of data.

As described, in some embodiments, the client device 130 may be a computing device such as a mobile smartphone device, a tablet computing device, a personal computer device, or a thin-client device. The client device 130 may be configured to operate with the system 100 for generating access entitlement predictions or for generating attestation values associated with access entitlement data sets.

Respective client devices 130 may include a processor, a memory, or a communication interface, similar to features of the example processor, memory, or communication interfaces of the system 100. In some embodiments, the client device 130 may be a computing device associated with a local area network, and may transmit one or more data messages or data sets to the system 100.

The networked computing resource 160 may be a computing device including a processor, a memory, or a communication interface, similar to the system 100. The networked computing resource 160 may be server devices for providing or hosting electronic mail, databases, file management repositories, or applications, among other example resources.

Referring again to the system 100 of FIG. 1, the entitlement application 112 may include processor-executable instructions for generating attestation values to be associated with user entitlement data sets for identifying entitlements to resources that may be anomalous.

For example, entitlements that may be potentially anomalous may include a student intern user working as a customer service representative within a banking organization being associated with administrative level access to highly confidential human resources databases of the organization's employees (e.g., access level that may be incongruent and unintended for the role that the student intern user may be occupying).

In some embodiments, attestation values may be numerical scores or other relative indicators that identify a level of anomaly associated with entitlement accesses. In the above example, an attestation value of 9 on a scale of 1 to 10 may indicate that the associated entitlement may be very likely anomalous or un-intended, and may require operations for scrutinizing the entitlement. In contrast, an attestation value of 1 on the scale of 1 to 10 may indicate that the associated entitlement may be "expected" or in line with entitlements of users associated with a similar role within the organization.

In some embodiments, the entitlement application 112 may include processor executable instructions of at least one of statistical operations, classification operations, or recommendation operations. In some embodiments, the output of one or more of such operations may be associated with weights based on inputs received at one or more client devices 130 from subject matter expert users of entitlement evaluations.

A processor 102 of the system may conduct operations of the entitlement application 112.

In some embodiments, the processor 102 may generate an ordered list or ranking of user entitlements to networked computing resources by assigning an attestation value to a given entitlement. In some embodiments, the processor 102 may generate attestation values based on unsupervised, machine-learning model operations, and may be based on at least one of operations associated with statistical analysis, classification operations, or recommendation operations.

In some embodiments, an attestation value associated with an entitlement may be based on pervasiveness of the entitlement among a population of user identifiers at an organizational level or across an entire organization. For example, an attestation value may be based on the pervasiveness of an entitlement at the global level (organizational), or at a local level, such as line of business and BUFUGU (Business Unit, Functional Unit, Group Unit).

In some embodiments, an attestation value may be evaluated based on a prior-determined or dynamically determined threshold value for identifying whether the given entitlement may be anomalous. Other types of attestation evaluation operations may be used. In some embodiments, in the event that an attestation value is identified as beyond the threshold value, the processor 102 may transmit a signal for displaying the identified attestation value at a client device 130, and the user of the client device 130 may provide an input signal for accepting or rejecting the associated entitlement.

In some embodiments, operations of the entitlement application 112 may include identifying entitlements that may not reach the prior-determined threshold (e.g., identified as most likely acceptable). Such identified entitlements may not need to be further scrutinized and removed from entitlements that may be identified for further operations, such as scrutiny by an auditing user of the entitlements. Such entitlements may be considered to extremely benign or of little concern to anticipated operations of an organization.

As an illustrating example, user entitlements to network computing resources, such as communication tools (e.g., Skype™, Slack™ or WebEx™) may be identified as not reaching a prior-determined threshold associated with potentially anomalous entitlements. It may be common for a majority of users of an organization to be provided access to communication applications for internal and external communications.

In other examples, user entitlements may be associated with user identities of a particular sub-group of an organization, but such entitlements may not be common across the organization. In some scenarios, the processor 102 may be configured to forego operations to further scrutinize the entitlements based at least on a user's association with the sub-group of the organization. That is, attestation values associated with user entitlements may be generated based on an identified user's association with a particular sub-group (e.g., hierarchal position).

In some embodiments, the entitlement application 112 may include processor-executable instructions for conducting operations of a statistical evaluator. The processor 102 may generate attestation values based on statistical models. The statistical models may be generated based on prior-identified entitlement data sets. The statistical models may be trained to generate attestation values for providing an indication of a level of anomaly associated with given entitlement values. In some embodiments attestation values for evaluating anomalous nature of given entitlements may be based on statistical analysis of features, roles, or other factors of other user identities having the given entitlement.

As described in some examples, an attestation value may provide an indication on how pervasive an entitlement to networked computing resources may be. For example, within an organization, a majority of users may be associated with entitlements for providing access to communication tools, such as Skype™, Slack™, or WebEx™. Granting of such entitlements may be identified to be common-place and may not contribute to unintended operations, administrative users may not be tasked with reviewing or auditing such entitlements for the organization.

In contrast, there may be a small number of users within an organization who may have user identities associated with entitlements for accessing database servers having trade secret information. In such scenarios, statistical analysis operations may identify user entitlements associated with networked computing resources providing access to trade secret information as being potentially anomalous, thereby generating attestation values indicating that further scrutinizing operations of the given entitlement may be warranted.

Accordingly, in some scenarios, entitlements associated with a majority of user identifiers within an organization may be associated with a relatively low attestation value for indicating that further scrutiny may not be required. Whereas entitlements associated with a selected few user identifiers may be associated with a relatively higher attestation value for indicating that further scrutiny of such entitlements may be required. By associating attestation values to entitlements, the processor 102 may be configured to focus on a sub-set of entitlements for scrutinizing during security audit operations.

In some embodiments, attestation values may be generated or calculated based on n levels of hierarchy, where n may be determined based on a pre-identified quantity of granularity. Greater values of n may represent a desired greater level of granularity. In an example, n is two. Other levels of particularity are also contemplated. In some embodiments, attestation values may be generated for a number of different levels, and normalized, for example, to a value between 0 and 1.

Figure 2:
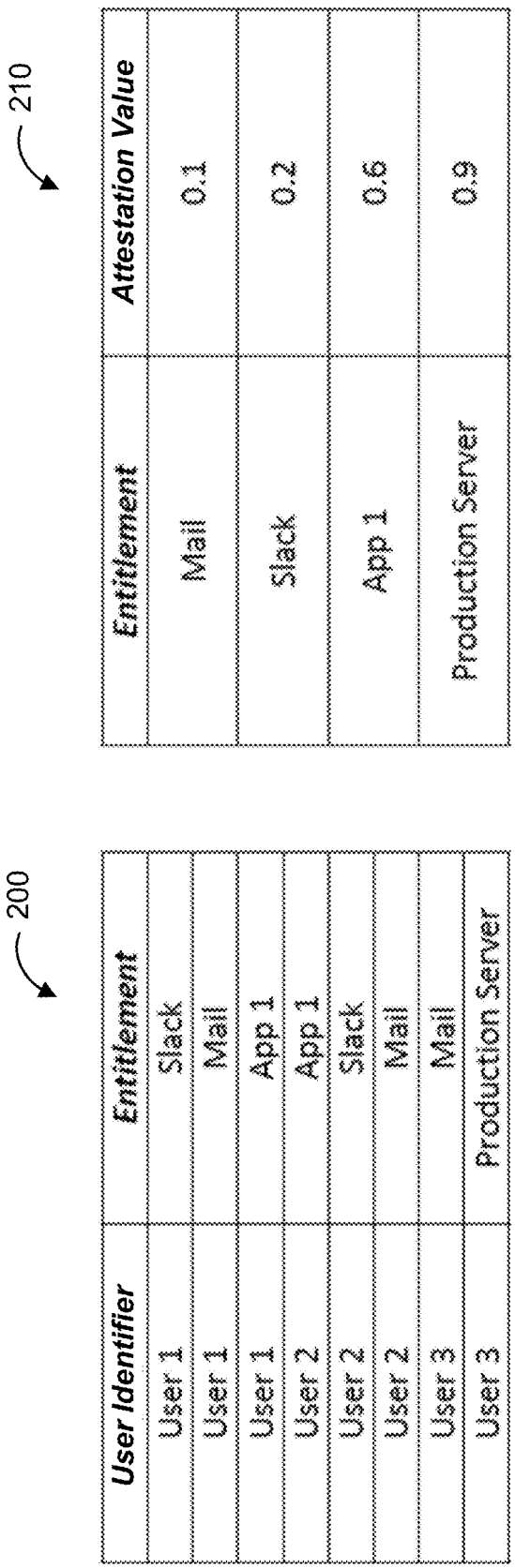
FIG. 2 illustrates tables showing example entitlements associated with user identifiers, and associated attestation values for the respective entitlements, in accordance with embodiments of the present disclosure.

Reference is made to FIG. 2, which illustrates tables showing example entitlements associated with user identifiers, and associated attestation values for the respective entitlements, in accordance with embodiments of the present disclosure.

A first table 200 illustrates a selection of user identifiers, such as "User 1", "User 2" and "User 3", and associated entitlements to access-controlled computing resource applications, such as "Slack", "Mail", "App 1" and "Production Server". A second table 210 illustrates the respective entitlements and an associated attestation value based on statistical model operations of the entitlement application 112 of FIG. 1.

In the illustrated example, "Production Server" may be identified as a critical entitlement, and very few (e.g., one) user may have access to the production server within the organization. Accordingly, the processor 102 may generate a higher attestation value as compared to other attestation values associated with other entitlements.

In another example, "Mail" entitlement may be associated with a relatively low attestation value as compared to other attestation values associated with other entitlements, at least because a majority of users within an organization may have access to electronic mail applications. In the present example, the "Mail" entitlement may be associated with a relatively low attestation value. Such entitlements may not be the subject of entitlement audit operations described in the present disclosure.

In examples described above, the entitlement application 112 may include operations based on a plurality of statistical models associated with a quantity of user identifiers associated with a given entitlement, a quantity of sub-groups within an organization associated with the given entitlement, among other models. The entitlement application 112 may generate attestation values normalized on a scale between 0 and 1. In some embodiments, an attestation value may be based on context associated with granting entitlements within an organization.

In the second table 210, example attestation values are provided, and may be based on how common access to a computing resource may be. For example, entitlements to a mail application and server may be provided for a majority of user identifiers, the attestation value of 0.1 may represent that the entitlement is very unlikely to be an anomaly. In contrast, entitlements to a "production server" may only statistically be granted to a selected few user identifiers, the associated attestation value may represent that the entitlement may require operations for scrutinizing the propriety of such an entitlement associated with the user identifier.

In some embodiments, an attestation value associated with an entitlement R(E) may be generated based on a summation of attestation values for the given entitlement at various levels of hierarchy, represented in equation (1):

$$R(E) = \sum_H R_{h_i}(E), \text{ where } h_i \epsilon H \quad (1)$$

A hierarchy level may represent a structural unit within an organization. For example, an organization may be structured based on business units, functional units, group units, or teams. Respective hierarchy levels, H, may include teams $h_i$, and may respectively be associated with a set of sub-team. For example, H={$h_1$={sub-team 1, sub-team 2, ... }, $h_2$={sub-team 1, sub-team 2, ... }, ... }. In some embodiments, attestation values may be generated based on a number of teams and sub-teams.

For respective levels of hierarchy, an attestation value $R_{h_i}(E)$ may be generated based on equation (2):

$$R_{h_i}(E) = \left[1 - \left(\frac{N(E)}{T} \times \frac{N_{h_i}(E)}{h_i}\right)\right] \times [T - N(E)] \quad (2)$$

where N(E) represents a quantity of users within the organization being associated with the entitlement; T represents a total quantity of users in the organization; $N_{h_i}(E)$ is a total quantity of users associated with the given entitlement in that given hierarchy level; and $h_i$ is a total quantity of employees associated with the given hierarchy level. In some embodiments, the attestation value may be normalized to fall in a range of [0, 1], with 1 representing a high attestation value (e.g., associated with an indication of potential anomaly).

The second term in equation (2) may represent the attestation value associated with an entitlement, and may be a relatively high value if very few users are associated with that entitlement. As more users or identities are associated with the entitlement, this second term in equation (2) may be smaller in magnitude.

The first term in equation (2) may be a correction term, which adjusts a magnitude of the attestation value represented by the second term, as it relates to a hierarchy level.

In some embodiments, given entitlements may be provided for specific sub-groups of user identifiers (e.g., only a particular team can own these entitlements), and an attestation value associated with these entitlements may indicate a relatively low anomaly nature if assessed from the perspective of a user identifier that is part of the sub-group. In contrast, the attestation value may be relatively high if assessed from the perspective of a user that may not be part of the given sub-group. Accordingly, a user identifier associated with an entitlement providing access to a computing resource specific to another sub-group may result in generating a relatively high attestation value. In the present example, the first term of equation (2) may bias the attestation value to be a higher value, as such a user identifier may not be associated with a specific sub-group where the entitlement to computing resource may be prevalent.

In some scenarios, individual score hierarchies can be used to generate identity and entitlement pairings. For example, an entitlement is not attestable conditioned on the user being in a particular team.

In some scenarios, a manager user of a sub-group team may be associated with specific entitlements to computing resources, such as access to payroll information of direct reports, which may not represent requirement to unique access protection to computing resources. For example, most manager users across different sub-groups may be associated with such entitlements to payroll information. In such examples, entitlements may be associated with attestation values generated based on a perspective of various levels of a hierarchy for generating an attestation value. Accordingly, operations associated with equation (1) may be conducted to generate attestation scores for a given entitlement to quantify an anomalous nature from a broader perspective.

In some embodiments, the processor 102 may generate an attestation value for determining whether a generated entitlement may be the subject of downstream operations for scrutinizing anomalous nature of the entitlement. For example, an attestation value that may exceed a pre-identified threshold value may be subject of a downstream operation for scrutinizing propriety of the entitlement associated with the given user identifier. In contrast, an attestation value that may not exceed the pre-identified threshold value may not be subject of downstream operations for scrutinizing whether the entitlement associated with the given user identifier is anomalous.

In some embodiments, threshold values for triggering downstream operations for scrutinizing propriety of entitlements may be dynamically determined based on statistical models described herein.

In some examples, pre-identified threshold values may be based on prior identified attestation values, where each count is the number of users multiplied by entitlements in a bin, and a spike or bimodal distribution delineating a threshold. In scenarios where there may be a noticeable increase (e.g., data value spike) or bimodal distribution, that the value may be identified as the pre-identified threshold value.

In some embodiments, threshold values may be dynamically refined based on received feedback operations indicating scenarios where entitlements were not subject of operations to scrutinize the entitlements when it may have been beneficial to scrutinize the entitlements. Such a feedback loop may be implemented to adjust threshold as needed.

In some embodiments, an attestation value may be a basis for generating a ranked or ordered list of entitlements for identifying potential anomalous entitlements. By ranking entitlements based on an ordered list of associated attestation values, the entitlement application 112 may include operations for transmitting signals to an administrative user conducting entitlement audits to scrutinize entitlements to computing resources that have a greater chance of being identified as anomalous. Based on operations described herein of statistical models, a smaller quantity of entitlements may be identified for immediate scrutiny during entitlement audit operations.

In some embodiments, the entitlement application 112 may generate attestation values based on classification operations described herein. In some embodiments, classification operations may include classification models based on self-supervised learning or unsupervised learning. In some embodiments, classification operations may be based on models supporting categorical variables (e.g., either via embeddings or via numerical representations and learned thresholds). In some examples, classification models may be based on operations of an xgboost library classifier.

In some embodiments, classification models may be trained based on synthetic training data generated based on one or more rules. Labelled data may not initially available for training classification models.

In some scenarios, synthetic data may be generated to be reflective of practical scenarios. For example, synthetic data may not be generated where a user identifier may be associated with an entitlement for a sub-group or incompatible "business unit, functional unit, group unit". For example, synthetic data representing pairing of a cat with a wolf may be undesirable, as opposed to pairing a cat with a tiger (which may be more reflective of a practical scenario). Operations for generating synthetic data may be based on sampling a quantity of user identifiers to generate associated entitlements, and generating adjustments based on practical scenarios.

In some embodiments, classifier training data sets may include identifier-entitlement tuples, and the identifier-entitlement tuples may include a combination of user identifier attributes (e.g., "User 1", associated job title or sub-group) and an associated entitlement to computing resources.

In some embodiments, synthetic identifier-entitlement pairs may be negative training data samples. In some embodiments, synthetic identity-entitlement pairs for use as training data may include "negative samples" or negative observations, pairing entitlements with user identities that should not have such associated entitlements. Example "negative samples" may be formed based labelled or annotated as a negative sample. An approach to generating negative training data set samples may be akin to those implemented in generative adversarial networks.

In some scenarios, the system 100 may store data sets representing identifier-entitlements. The data sets representing identifier-entitlements may represent a quantity of permutations or combinations of entitlements associated with user identifiers. However, the number of actual identifier-entitlements may be relatively small as compared to the total quantity of identifier-entitlement permutations or combinations. Thus, a set of identifier-entitlement data sets may be characterized by an appreciable negative space. In some scenarios, the system 100 may be configured to train classifier models based on negative sample data to provide a number of identities and a number of entitlements may result in a large number of potential combinations. However, the number of actual real-world pairings between entitlements and identities may be a small fraction as compared to the number of potential combinations. Thus, it will be appreciated that identity-entitlement data may include a large amount of negative space. Thus, in some embodiments, the system 100 may be configured to train classifier models for generating attestation values based on both positive sample data and negative sample training data. Operations of the entitlement application 112 may include processor-executable instructions to identify anomalous user identifier—entitlement pairs for downstream analysis.

In some embodiments, classifier models may be trained, at a training phase, on training data as described herein. Classifier models may be trained to detect which identifier-entitlement pairs may be non-anomalous, and which identifier-entitlement pairs may be potentially anomalous or manufactured. In some embodiments, the entitlement application 112 may include operations for validating or testing the classifier models.

In scenarios where classifier models are trained, validated, or tested, the classifier models may be configured to classify input data including user identifiers associated with entitlements for generating attestation scores.

In some embodiments, classifier models may include operations to classify or label an identifier-entitlement pair as "true" or "false". A "false" classification may be based on a classification learned from synthetic negative samples described herein and may indicate that an identity-entitlement pair should not exist. Thus, an identifier-entitlement pair that is classified as a "false" identifier-entitlement pair may be associated with an attestation value indicating a potential anomalous data point. In some embodiments, above a threshold, the attestation value may be identified as true or false. In some embodiments, the identity-entitlement risk score may be normalized between 0 and 1.

A "false" misclassification can indicate that an identity should not have the paired entitlement, and that it is out of pattern, and should be evaluated. Accordingly, classification models may include operations to refine operations for learning from entitlement pairings associated with similarly identified identifiers.

An attestation value associated with a particular entitlement may be determined by summing the attestation values over the identifiers for each respective identifier-entitlement pair of that particular entitlement.

In some scenarios, an attestation value may be generated for a particular dimension, for example a hierarchy level, such as a business unit or a team, by summing attestation values associated with identifier-entitlement pairs for identifiers associated with a particular hierarchy level.

In some embodiments, an attestation value may be compared to a threshold value for determining whether the identified entitlement should be subject to operations for scrutinizing an anomalous entitlement.

In some embodiments, a confidence level value may be associated with an identifier-entitlement pair. If operations provide trending confidence for particular identifier-entitlement pairs, a high confidence value may be assigned (those that would be considered not attestable). If confidence values associated with an identifier-entitlement pair is relatively lower, operations may be conducted for scrutinizing a potentially anomalous entitlement.

In some embodiments, classification models may be configured to address a "cold-start" problem, such as for generating newly created entitlements for a new identifier. For example, such a "cold-start" problem may be for addressing "how to decide what to recommend for a newcomer?" In some scenarios, an input data set including data representing the new identifier, an associated sub-group, other identifiers within the associated sub-group, among other example input data, the entitlement application 112 may include operations to generate proposed entitlements for associating with the new identifier. For example, a user identifier "Jane" in Capital Markets may be associated with an entitlement to a Bloomberg application, whereas a user identifier "Jerry" associated with a marketing sub-group may not have an entitlement to the Bloomberg application. Accordingly, the entitlement application 112 may conduct operations to generate a new identifier-entitlement pairs to infer that a new user associated with the Capital Markets team may be provided with an entitlement to the Bloomberg application.

In some embodiments, the entitlement application 112 may include operations directed to a recommendation model. In some embodiments, the recommendation model may include hybrid role-collaborative filtering operations. The recommendation model may be configured to be associated with generating attestation scores for evaluating an anomalous nature of identifier-entitlement pairs.

In some embodiments, the recommendation model may include operations to identify a plurality of other identifiers or identities having similar entitlement characteristics, based on an input identifier-entitlement pair. In some embodiments, the recommendation model may be trained based on training data sets representing combinations of entitlement statistics, job title or descriptions, or hierarchal associations for a plurality of identifiers for a particular organization.

In some embodiments, the recommendation model may be configured to generate entitlement predictions based on an input data set of one or more identifiers and other identifier attributes (e.g., hierarchy or sub-group information associated with the identifier, etc.).

As described in the present disclosure, embodiments of the entitlement application 112 may include processor-executable instructions for generating access entitlement to networked computing resources. In some scenarios, it may be desirable to generate entitlement predictions based on an entitlement model and input data sets representing user identifier credentials. In some embodiments, the entitlement model may be trained on data sets representing identifier-entitlement pairs for a particular organization.

In some scenarios, users associated with similar user credentials (e.g., sub-group within an organization, job description/title, tenure within an organization, etc.) may have similar entitlements to access-controlled networked computing resources. For example, stock trader users within a banking institution may have entitlements to access licensed financial modelling software, whereas retail investment advisor users within the same banking institution may have entitlements to access retail client database software without access to the above-described licensed financial modeling software. Other user credentials for identifying similarities may be used.

It may be desirable to provide entitlement application 112 operations and models for generating predicted entitlements based on user input and for generating attestation values (e.g., for identifying an anomalous nature of associated entitlements to computing resources) at a user role level.

Operations for generating entitlements or attestation values at a user role level of abstraction may contribute to reducing computational resources required that otherwise would be required for assessing anomalous nature of user identifier entitlements to access-controlled computing resources.

In some embodiments, the entitlement application 112 may be configured to generate data sets representing entitlements associated with user roles. A user role may be associated with a job title, a sub-group or organizational team, or a user duty or function within the organization, among other examples.

In some embodiments, a role may be defined by a group of identities having a common set of tasks, or may be defined as a combination of entitlements used by identities of a similar role.

In some scenarios, role mining operations may include clustering identities into a "role" for associating or mapping to combinations of entitlements to computing resources. For example, a role may be associated with clustered entitlements. For example, roles may include an "information technology" role or a "business" role.

In some embodiments, for a user to access a particular computing resources (e.g., computing server), the user identifier may need to be associated with multiple entitlements. Such entitlements may include, for example, read access, write access, or execution rights. Such entitlements may be bundled and associated with an "information technology" role.

Further, such a user who is associated with entitlements associated with read/write access to a particular server may also be associated with entitlement access to Bloomberg™ terminal computing resources, and may be associated with permissions to buy/sell financial instruments on a particular account. In the present example, the disparate roles may be combined into a business role. In some examples, users may have entitlements associated with numerous roles, where a business roles may be on a different hierarchical level than a job role.

In an organization, groups of entitlements may be shared between employees performing the same or similar roles, thereby defining a role. Roles with homogenous attestation values can be attested to as a group, rather than individually, which may be desirable to reduce operations for separately conducting operations for assessing anomalous nature of entitlements to computing resources.

In some embodiments, the entitlement application 112 may include operations for identifying roles based on: (1) generating an entitlement matrix; (2) generating a graph-based representation of the entitlement matrix, which may include an identifier graph or an entitlement graph; and/or (3) clustering identities based on the identities graph, or clustering entitlements based on the entitlement graph.

In some embodiments, the entitlement application 112 may be configured to generate one or more entitlement matrices. An example entitlement matrix A is illustrated as equation (3) below.

In some embodiments, an entitlement matrix may be generated by organizing data representing a list of entitlements (such as lists of different sizes, listing entitlements for different users) to provide an entitlement vector. The entitlement matrix may have a size corresponding to existing entitlements for the plurality of user identifiers. In some embodiments, an entitlements matrix A may be as provided in equation (3), where the respective elements of the matrix are provided for in in equation (4):

$$A = \begin{bmatrix} 1 & 0 & \dots \\ 0 & 1 & \dots \\ \dots & \dots & \dots \end{bmatrix}_{M \times N} \quad (3)$$

$$A_{ij} = \begin{cases} 1 & \text{if user } i \text{ has access } j \\ 0 & \text{otherwise} \end{cases} \quad (4)$$

In the present example, matrix A has the size M×N, with M being the total number of users, and N the total number of entitlements (or accesses) throughout the organization.

Matrix A may represent data about identities and entitlements used for forming communities of roles or tasks. Matrix A may be used to construct roles on either dimension (horizontal, or vertical) depending on whether the entitlement application 112 may include operations for defining a role as a group of identities that share the same task, or as a group of entitlements used by identities of the same role.

In some scenarios, existing methods of clustering identities or entitlements based on an entitlements matrix (e.g., matrix A) may be inefficient as the size of the entitlements matrix increases. For example, an organization may include 100,000 identities (employees) associated with one million entitlements. In the present example, the entitlement matrix may represent approximately one hundred billion possible entitlement combinations, and the matrix may be relatively large and may include numerous portions of 'negative space' representing no entitlements for a particular identifier/computing resource pair.

It may be desirable to provide alternative representations of entitlement matrix data sets for generating entitlement predictions or for generating attestation values for evaluating anomalous nature of identifier—entitlement pairs representing entitlements.

In some embodiments, entitlements application 112 may include operations to generate graph-based representations of the entitlement matrix. In some embodiments, an identities graph representing identities and similarities among the identities may be generated. In another example, an entitlement graph representing entitlements and similarities among the entitlements may be generated.

An example identity graph may include a plurality of nodes, where respective nodes represent a user identifier or identity. The example identity graph may include a plurality of edges, respective edges connecting a given pair of identities having a common entitlement, thereby generating a fully connected graph-based representation of identities and entitlements.

In some embodiments, edges may represent weights, and the weights may be based on a quantity of entitlements common to or shared by the respective pair of identities. In some examples, a weight of an edge may be proportional to a number of common entitlements among a respective pair of identities. In some examples, the weight represented by an edge may be corrected based on factors such as (i) an "occurrence" of the entitlement, and (ii) a "load" of a connected identity.

An "importance" metric associated with an entitlement may be defined as a number of identities having that entitlement or the occurrences of that entitlement.

A "load", or "user task load", of an identity may be the number of entitlements that the identity has.

Continuing with the present example, weight $W_{ij}$ between nodes i and j in an identities graph-based representation of matrix A, can be determined as provided in equation (5):

$$W_{ij} = \sum_{k=0}^{N} A_{ik} A_{jk} \frac{\overline{L}}{L_i} \times \frac{\overline{O}}{O_k} + \sum_{k=0}^{N} A_{ik} A_{jk} \frac{\overline{L}}{L_j} \times \frac{\overline{O}}{O_k} \quad (5)$$

where L represents the load (number of entitlements) of identity i or identity j, and O represents the occurrence (number of identities) of entitlement k, respectively.

In some embodiments, an average load $\overline{L}$ and average occurrence $\overline{O}$ may be used in the denominator of equation (5) to normalize the weights.

Accordingly, in some embodiments, graph edge weights may be generated based on a number of entitlements each pair of identities share, or weighted based on the identity load as well as occurrence of the entitlements.

In embodiments of graph-based representations described herein, a weight associated with a pair of identity nodes may be correlated with similarity between the identities, and may be represented by a similarity score. More specific (low-occurrence) entitlements may represent a larger similarity score value as between identities as compared to when commonly occurring entitlements being shared between identities. Further, identities with a larger number of entitlements may require a relatively larger number of shared entitlements with an other note for being associated with a higher similarity score, as compared to light-loaded identities.

To systematically generate weights, equation (5) may be formulated based on matrix algebra. Such operations may be conducted by configuring Spark™ libraries, among other computation libraries, and may be scalable to large and/or sparse datasets. In some embodiments, a weight matrix, W, may be derived based on the following operations:

$$W = \overline{LO} A_{M \times N} O_{N \times N} A_{N \times M}^{T} L_{M \times M} \quad (6)$$

where $A^T$ is the transpose of matrix A, and O, and L are defined as the following:

$$O_{ij} = \begin{cases} \frac{1}{O_i} & \text{if } i = j \\ o & \text{otherwise} \end{cases} \quad (7)$$

$$L_{ij} = \begin{cases} \frac{1}{L_i} & \text{if } i = j \\ o & \text{otherwise} \end{cases} \quad (8)$$

In some embodiments, a graph-based representation may be used to represent an entitlements graph. An entitlements graph may include nodes representing respective entitlements, and edges connecting pairs of entitlements having common identities.

As illustrated in some examples described in the present disclosure, groups of entitlements may be shared among users or identities having same or similar roles. To reduce the quantity or magnitude of computations among data sets for determining data sets representing anomalous entitlements to computing resources, it may be desirable to provide systems and methods of generating attestation values for evaluating anomalous entitlements based on role identities. In some embodiments, role identities may be correlated or be an extension of individual user identities.

In some embodiments, the entitlement application 112 may include operations for generating role-based entitlements based on clustering operations. The role-based entitlements may be generated based on identifier-entitlement data sets represented with graph-based models.

In some embodiments, the entitlement application 112 may include operations of a Markov Cluster method or Label Propagation method. The method may include identifying combinations or groups of nodes (e.g., identities or entitlements) based on data represented by node connections and/or edge weights associated with the node connections.

In embodiments that include operations of a Markov Cluster method, hyper parameters of the Markov Clustering may include clustering inflation and expansion parameters that may be tuned and optimized based on a cluster modularity parameter, which may be a fraction of edges that fall within given groups minus an expected fraction if edges were distributed at random. In some embodiments, inflation parameters may affect granularity of resulting clusters. In some embodiments, expansion parameters may be directed to allowing flow to connect various regions of a graph-based representation.

In some embodiments, operations of the entitlement application 112 may not require pre-defined objective functions or prior-identified data about the nodes (representing identities or entitlements). In some examples, hyper parameters may be optimized based on cluster modularity parameters, which may define fraction of edges that fall within given groups minus an expected fraction if edges were distributed at random.

Figure 3:
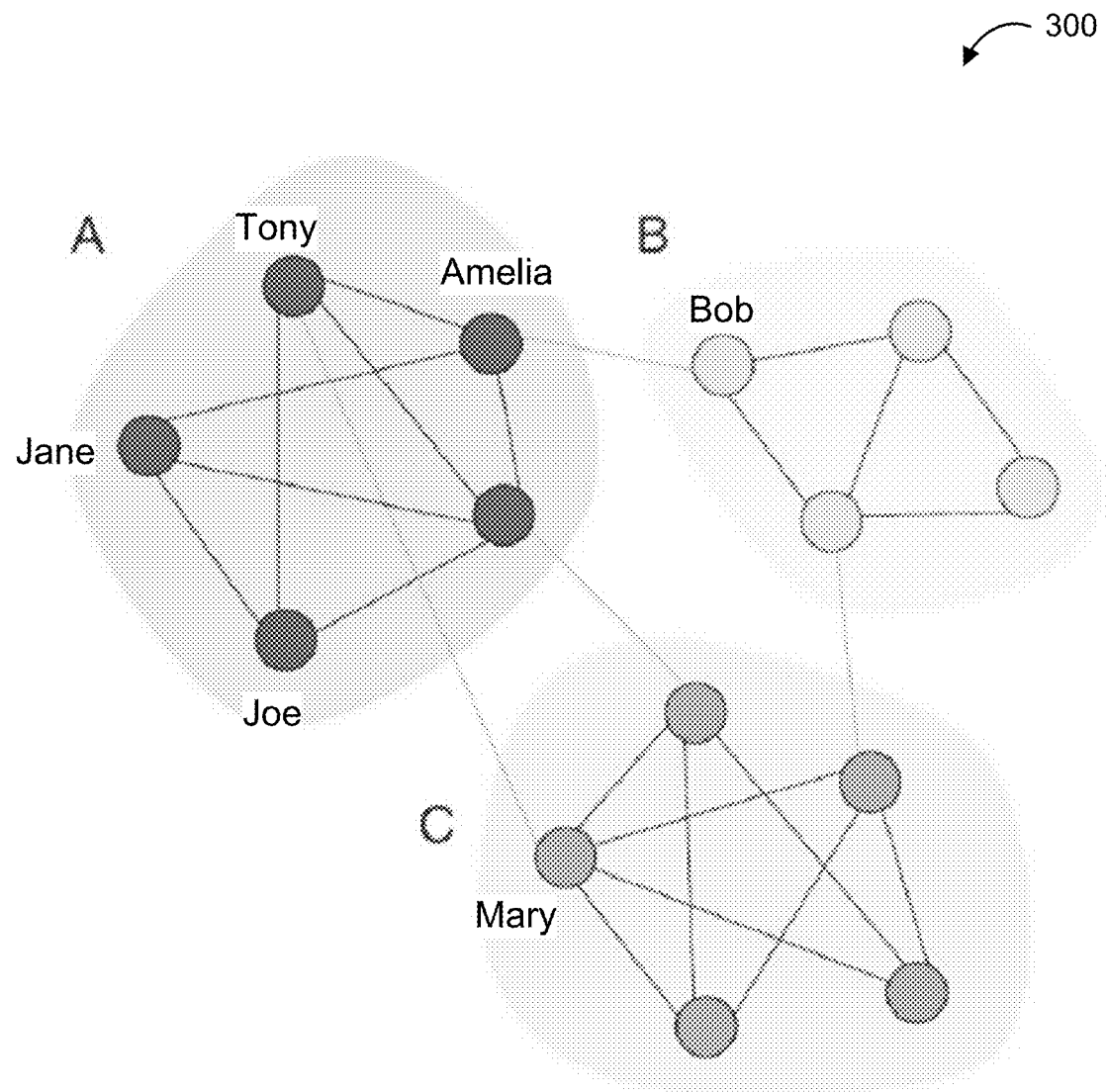
FIG. 3 illustrates a schematic diagram of an example graph-based representation of identifier-entitlement data set, in accordance with embodiments of the present disclosure.

Reference is made to FIG. 3, which illustrates a schematic diagram of an example graph-based representation of identifier-entitlement data 300, in accordance with embodiments of the present disclosure.

In the example illustrated in FIG. 3, a plurality of nodes may represent respective identities, such as names of particular users. Edges connecting respective pair of nodes represent comment entitlements to computing resources. Edges may be associated with weights, where respective weights may represent a similarity nature of entitlements as between the nodes. Scenarios where shared entitlements between nodes have a greater degree of uniqueness, the weight associated with the edge may be numerically greater.

In some embodiments, the entitlement application 112 may associate weights to edges based on factors such as uniqueness of common entitlements between nodes (e.g., occurrence of entitlements) or percentage of overlapping entitlements. In some embodiments, the entitlement application 112 may associate weights to edges based on an importance of shared access/entitlement to computing resources, based on a number of identities who may have access to the particular computing resource. In some embodiments, the entitlement application 112 may associate weights to edges based on a load of the respective identities, which may be correlated with a number of entitlements associated with a given identity.

In FIG. 3, the entitlement application 112 may conduct clustering operations for generating three example clusters or roles. As an example, Tony, Amelia, Joe, Jane, and others associated with Cluster A may be identified as group representing a common role, whereas Mary and Bob may be identified in other clusters representing other types of roles.

In the illustrated example of FIG. 3, a weight associated with an edge connecting Tony and Mary and a weight associated with edge connecting Amelia and Bob may not have met a threshold to include Mary or Bob within the Cluster A.

In FIG. 3, the clustering operations of the identities-based graph provides role-based clusters based on identity-entitlement data sets. Accordingly, the clusters (A, B, and C) of identities may be designated as groups of identities having common roles. Based on such graph-based clustering operations, downstream operations for identifying an anomalous nature of identities may be conducted on a role-based level (e.g., clusters), rather than on an identity-based level. In some examples, clustering results (e.g., roles) may be validated based on a number of business application functions that the clusters span over and a qualitative assessment associated with the identified cluster roles.

In some other embodiments, the graph-based representation illustrated in FIG. 3 may be configured to represent an entitlements graph, where resulting cluster groups may be designated as a role defined as a group of entitlements.

In embodiments described herein, systems and methods may include operations for generating role-entitlement data sets based on graph-based representations of identity-entitlement data sets and clustering operations. Such operations may increase data scaling efficiencies, where identity-entitlement data sets may exponentially scale and where the data sets may include sparse negative space data. In some embodiments, systems and methods described herein may be implemented based on machine learning operations for structuring and automating entitlement attestation operations.

In some scenarios, a user's job title may be associated with a plurality of roles within the organization, where the respective roles may be associated with multiple entitlements. In such scenarios, attestation of entitlements for the new user may be conducted with greater efficiency based on features of role-based entitlement attestation operations described herein.

Figure 4A:
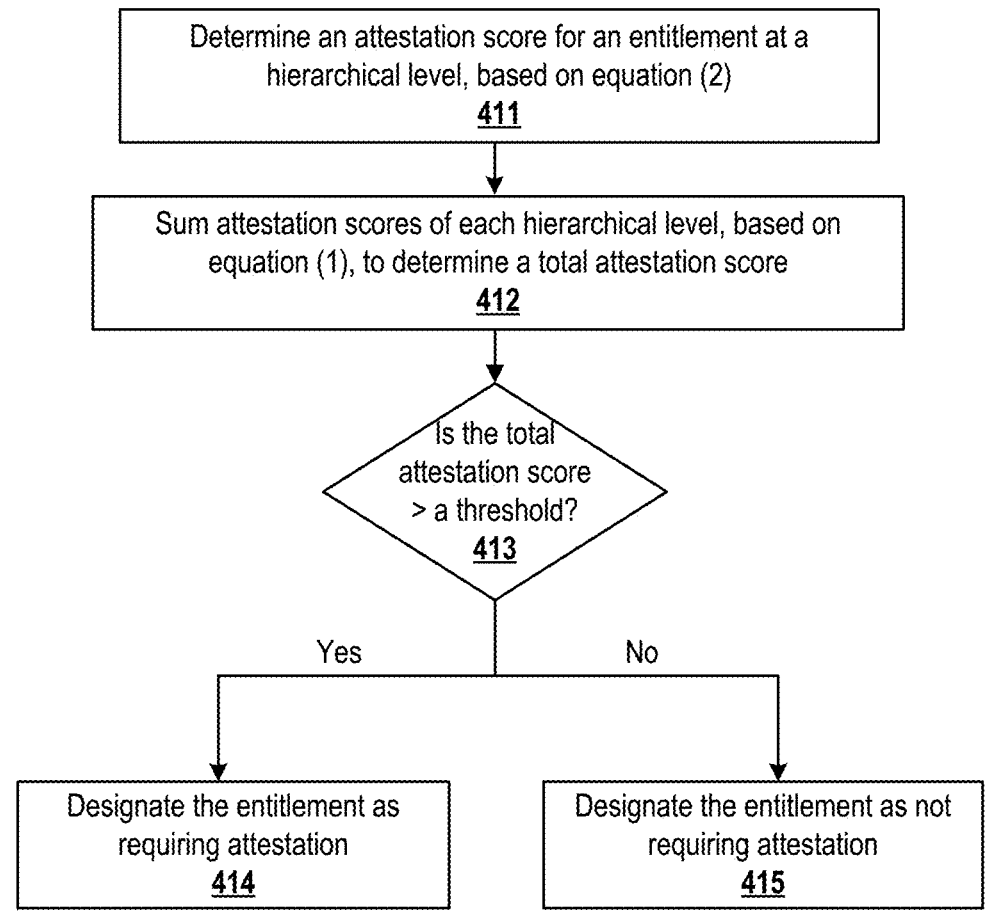
FIG. 4A illustrates a flow chart of a method of generating entitlement data sets representing access rights to networked computing resources, in accordance with embodiments of the present disclosure.

Reference is made to FIG. 4A, which illustrates a flow chart of a method 410 of generating entitlement data sets representing access rights to networked computing resources, in accordance with embodiments of the present disclosure. The method 410 may be conducted by the processor 102 of the system 100 (FIG. 1). Processor-readable instructions may be stored in the memory 106 and may be associated with the entitlement application 112 or other processor readable applications not illustrated in FIG. 1. The method 410 may include operations, such as data retrievals, data manipulations, data storage, or the like, and may include other computer executable functions.

At operation 411, the processor may determine an attestation score for an entitlement, at a particular hierarchical level, based on equation (2).

At operation 412, the processor may determine a total attestation score based on summing attestation scores of each hierarchical level, based on equation (1).

At operation 413, the processor may determine whether the total attestation score may meet a threshold value. If the attestation score meets the threshold value, the process advances to operation 414. If the attestation score does not meet the threshold value, the process proceeds to operation 415.

At operation 414, the processor may determine that the given entitlement may need to be subject to attestation operations. In some embodiments, attestation operations for the given entitlement may include downstream operations for determining whether the assigned entitlement is of an anomalous or unintended nature.

At operation 415, the processor may determine that the entitlement may not need to be subject to attestation operations.

In some embodiments, an entitlement may be triaged as compared to other entitlements for which an attestation score is determined using method 410.

It should be understood that one or more of the blocks may be performed in a different sequence or in an interleaved or iterative manner.

Figure 4B:
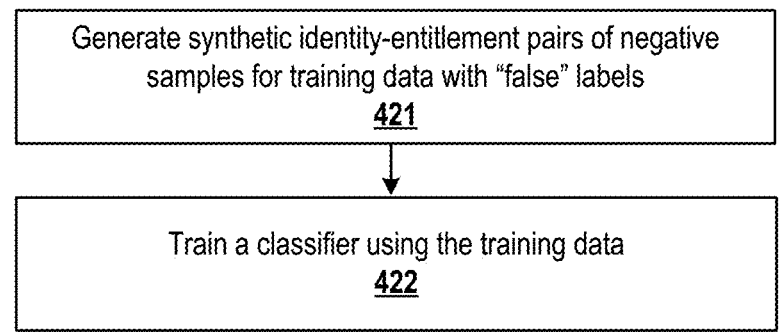
FIG. 4B illustrates a flow chart of a method of training a classification model, in accordance with embodiments of the present disclosure.

Reference is made to FIG. 4B, which illustrates a flow chart of a method 420 of training a classification model, in accordance with embodiments of the present disclosure. The method 420 may be conducted by the processor 102 of the system 100 (FIG. 1). Processor-readable instructions may be stored in the memory 106 and may be associated with the entitlement application 112 or other processor readable applications not illustrated in FIG. 1. The method 420 may include operations, such as data retrievals, data manipulations, data storage, or the like, and may include other computer executable functions.

At operation 421, the processor may generate synthetic identity-entitlement pairs of negative samples, with "false" labels, for use as training data.

At operation 422, the processor may train a classifier based on the training data.

It should be understood that one or more of the blocks may be performed in a different sequence or in an interleaved or iterative manner.

Figure 4C:
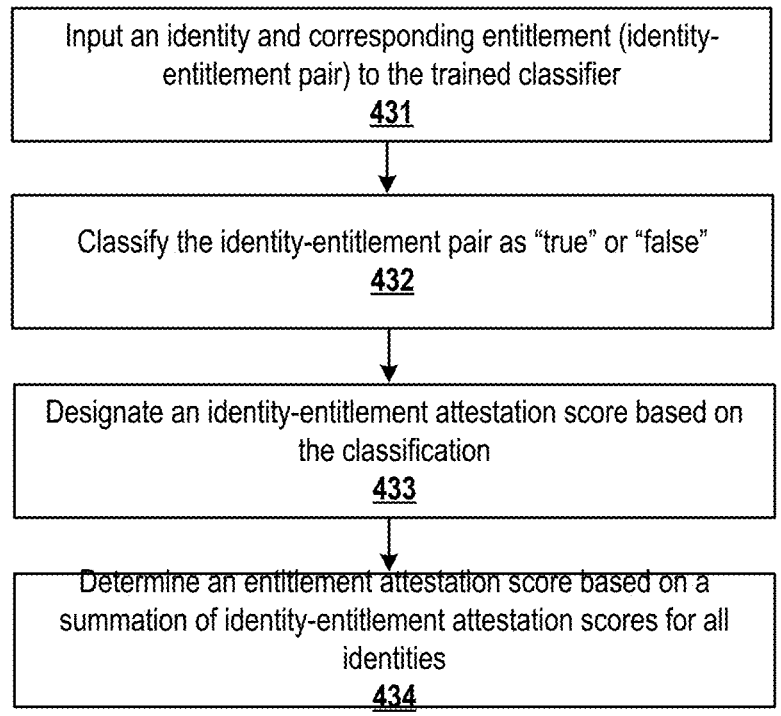
FIG. 4C illustrates a flow chart of a method of generating an attestation score associated with entitlements, in accordance with embodiments of the present disclosure.

Reference is made to FIG. 4C, which illustrates a flow chart of a method 430 of generating an attestation score associated with entitlements to access networked computing resources, in accordance with embodiments of the present disclosure. The method 430 may be conducted by the processor 102 of the system 100 (FIG. 1). Processor-readable instructions may be stored in the memory 106 and may be associated with the entitlement application 112 or other processor readable applications not illustrated in FIG. 1. The method 430 may include operations, such as data retrievals, data manipulations, data storage, or the like, and may include other computer executable functions.

At operation 431, the processor receives an identity and corresponding entitlement (identity-entitlement pair) as an input to a trained classifier.

At operation 432, the processor may classify the identity-entitlement pair as "true" or "false".

At operation 433, the processor may associate the identity-entitlement pair with a generated attestation score based on the classification.

At operation 434, the processor may determine that an attestation score based on a summation of identity-entitlement attestation scores for a plurality of identities.

It should be understood that one or more of the blocks may be performed in a different sequence or in an interleaved or iterative manner.

Figure 4D:
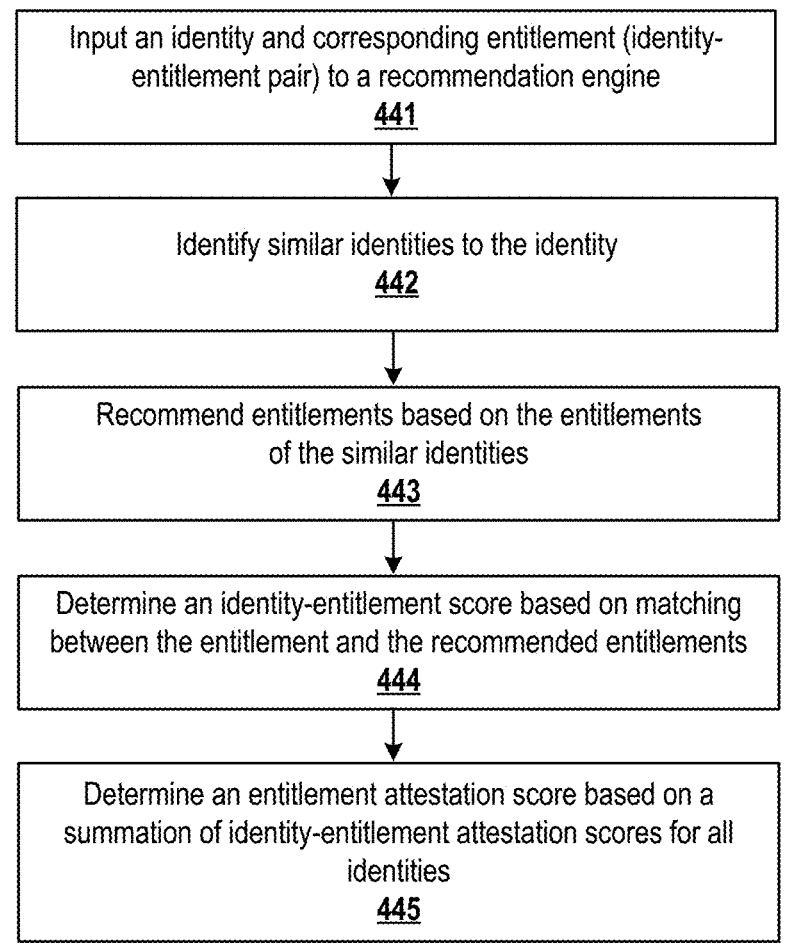
FIG. 4D illustrates a flow chart of a method of generating an attestation value associated with entitlements, in accordance with embodiments of the present disclosure.

Reference is made to FIG. 4D, which illustrates a flow chart of a method 440 of generating an attestation value associated with entitlements to access networked computing resources, in accordance with embodiments of the present disclosure. The method 440 may be conducted by the processor 102 of the system 100 (FIG. 1). Processor-readable instructions may be stored in the memory 106 and may be associated with the entitlement application 112 or other processor readable applications not illustrated in FIG. 1. The method 440 may include operations, such as data retrievals, data manipulations, data storage, or the like, and may include other computer executable functions.

At operation 441, the processor may receive an identity and corresponding entitlement (identity-entitlement pair) as input for a recommendation model.

At operation 442, the processor may determine similar identities.

At operation 443, the processor may determine recommended entitlements for the given identity, based on the entitlement of the similar identities.

At operation 444, the processor may determine an identity-entitlement score based on matching between the entitlement and the recommended entitlements.

At operation 445, the processor may determine an entitlement attestation score based on a summation of identity-entitlement risk scores for a plurality of identities.

It should be understood that one or more of the blocks may be performed in a different sequence or in an interleaved or iterative manner.

Figure 4E:
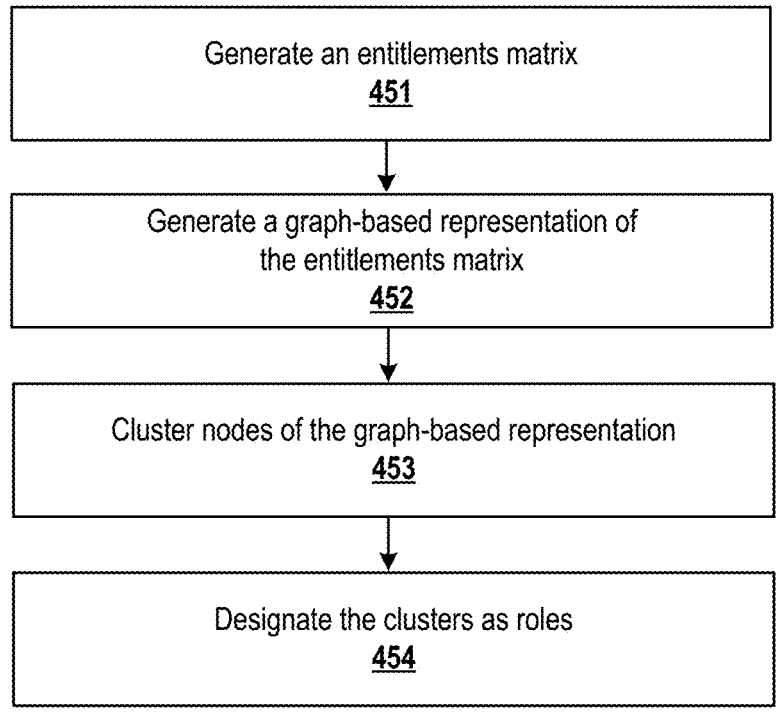
FIG. 4E illustrates a flow chart of a method of role mining, in accordance with embodiments of the present disclosure.

Reference is made to FIG. 4E, which illustrates a flow chart of a method 450 of role mining, in accordance with embodiments of the present disclosure. The method 450 may be conducted by the processor 102 of the system 100 (FIG. 1). Processor-readable instructions may be stored in the memory 106 and may be associated with the entitlement application 112 or other processor readable applications not illustrated in FIG. 1. The method 450 may include operations, such as data retrievals, data manipulations, data storage, or the like, and may include other computer executable functions.

At operation 451, the processor may generate an entitlements matrix. The entitlements matrix may include data sets representing entitlements to networked computing resources and identities.

At operation 452, the processor may generate a graph-based representation of the entitlements matrix. The graph-based representation may be an identities graph (identities represented as nodes, and entitlements represented as edge weights) or an entitlements graph (entitlements represented as nodes and identities represented as edge weights).

At operation 453, the processor may cluster nodes of the graph-based representation. In some embodiments, the cluster operations may be based on Markov clustering operations. In some embodiments, the cluster operations may be based on label propagation operations. In some embodiments, the cluster operations may be based on agglomerative clustering operations. In scenarios where the graph-based representation is an entitlements graph, entitlement nodes are clustered.

At operation 454, the processor determines roles based on the generated clusters.

It should be understood that one or more of the blocks may be performed in a different sequence or in an interleaved or iterative manner.

In some embodiments, the system 100 may generate recommendations on a quantity of attestations. The quantity of attestations may be large, and may necessitate large quantities of resources for downstream operations to scrutinize entitlements to networked computing resources. Accordingly, embodiments of systems and methods described herein may include operations for generating role-based entitlements for representing combinations of entitlements based on identified roles. Roles may be defined based on a combination of similarities among a plurality of identities. Accordingly, systems and methods described in the present disclosure may reduce the computational requirements or quantity of attestation operations for data sets representing entitlements to networked computing resources.

In some embodiments, input data sets may include a coordinate matrix representing entitlements associated with identifiers or identities.

For example, a set of entitlements may include: 'key_room_101', 'key_room_102', 'key_room_103', 'key_room_104', 'key_room_105', 'key_room_201', 'key_room_202', 'key_room_203', 'key_room_204', 'key_room_205', 'key_janitorial_room', 'key_reception_office', 'key_managers_office', 'key_basement', 'key_boilers_room', 'key_technician_office', 'key_roof', 'psswd_receiption_computer', 'psswd_manager_computer', 'psswd_guest_computer', 'psswd_wifi_router', 'admin_psswd_receiption_computer', 'admin_psswd_manager_computer', 'admin_psswd_guest_computer', 'admin_psswd_wifi_router', 'key_cleaning_cupboard', 'key_reception_desk', 'key_swimming_pool', 'key_sauna', 'key_storage_room', 'key_entrance', 'key_kitchen', 'key_equipment_cupboard', and 'key_electrical_board'.

For example, a set of employees may include:
'manager', 'deputy_manager', 'reception_1', 'reception_2', 'IT_expert', 'gardener', 'technician_1', 'technician_2', 'janitor_1', 'janitor_2', 'senior_janitor_1', 'senior_janitor_2', 'security_1', and 'security_2'.

The following employees may have the following entitlements:
'manager': ['key_managers_office', 'user_psswd_manager_computer', 'key_entrance', 'psswd_wifi_router'],
'deputy_manager': ['key_managers_office', 'user_psswd_manager_computer', 'key_entrance', 'psswd_wifi_router'],
'reception_1': ['key_room_101', 'key_room_102', 'key_room_103', 'key_room_104', 'key_room_105', 'key_room_201', 'key_room_202', 'key_room_203', 'key_room_204', 'key_room_205', 'key_reception_office', 'key_entrance', 'psswd_wifi_router', 'key_receiption_desk', 'key_storage_room', 'psswd_receiption_computer', 'psswd_guest_computer'],
'reception_2': ['key_room_101', 'key_room_102', 'key_room_103', 'key_room_104', 'key_room_105', 'key_room_201', 'key_room_202', 'key_room_203', 'key_room_204', 'key_room_205', 'key_reception_office', 'key_entrance', 'psswd_wifi_router', 'key_receiption_desk', 'key_storage_room', 'psswd_receiption_computer', 'psswd_guest_computer'],
'janitor_1': ['key_room_101', 'key_room_102', 'key_room_103', 'key_room_104', 'key_room_105', 'key_room_201', 'key_room_202', 'key_room_203', 'key_room_204', 'key_room_205', 'key_janitorial_room', 'key_storage_room', 'key_entrance', 'key_swimming_pool', 'key_sauna', 'key_cleaning_cupboard'], 'janitor_2': ['key_room_101', 'key_room_102', 'key_room_103', 'key_room_104', 'key_room_105', 'key_room_201', 'key_room_202', 'key_room_203', 'key_room_204', 'key_room_205', 'key_janitorial_room', 'key_storage_room', 'key_entrance', 'key_swimming_pool', 'key_sauna', 'key_cleaning_cupboard'],
'senior_janitor_1': ['key_room_201', 'key_room_202', 'key_room_203', 'key_room_204', 'key_room_205', 'key_janitorial_room', 'key_entrance', 'key_cleaning_cupboard', 'key_kitchen'],
'senior_janitor_2': ['key_room_101', 'key_room_102', 'key_room_103', 'key_room_104', 'key_room_105', 'key_janitorial_room', 'key_entrance', 'key_cleaning_cupboard', 'key_kitchen'],
'technician_1': ['key_basement', 'key_boilers_room', 'key_technician_office', 'key_roof', 'key_equipment_cupboard'],
'technician_2': ['key_technician_office', 'key_equipment_cupboard', 'key_electrical_board'],
'IT_expert': ['admin_psswd_receiption_computer', 'admin_psswd_manager_computer', 'admin_psswd_guest_computer', 'admin_psswd_wifi_router'],
'security_1': ['key_basement', 'key_boilers_room', 'key_technician_office', 'key_roof', 'key_swimming_pool', 'key_sauna', 'key_storage_room', 'key_entrance', 'key_kitchen'],
'security_2': ['key_basement', 'key_boilers_room', 'key_technician_office', 'key_roof', 'key_swimming_pool', 'key_sauna', 'key_storage_room', 'key_entrance', 'key_kitchen'],
'gardener': ['key_entrance', 'key_equipment_cupboard']

Table 1 illustrates an example of an employee-entitlement relationship for a subset of the data.

TABLE 1

| | Employee-Entitlement | |
|---|---|---|
| | Employee | Entitlement |
| 0 | manager | key_managers_office |
| 1 | deputy-manager | key_managers_office |
| 2 | reception_1 | key_room_101 |
| 3 | reception_2 | key_room_101 |
| 4 | janitor_1 | key_room_101 |

The data may also be categorized into applications and business units. For example, a set of applications may include:
'guest_room_keys': ['key_room_101', 'key_room_102', 'key_room_103', 'key_room_104', 'key_room_105', 'key_room_201', 'key_room_202', 'key_room_203', 'key_room_204', 'key_room_205'],
'staff keys': ['key_janitorial_room', 'key_reception_office', 'key_managers_office', 'key_basement', 'key_boilers_room', 'key_technician_office', 'key_roof', 'key_cleaning_cupboard', 'key_receiption_desk', 'key_swimming_pool', 'key_sauna', 'key_storage_room', 'key_entrance', 'key_kitchen', 'key_equipment_cupboard', 'key_electrical_board'],
'IT': ['psswd_receiption_computer', 'psswd_manager_computer', 'psswd_guest_computer', 'psswd_wifi_router', 'admin_psswd_receiption_computer', 'admin_psswd_manager_computer', 'admin_psswd_guest_computer', 'admin_psswd_wifi_router']

Table 2 illustrates an example of an application-entitlement relationship for a subset of the data.

TABLE 2

| | Application-Entitlement | |
|---|---|---|
| | Application | Entitlement |
| 11 | IT | psswd_wifi_router |
| 20 | IT | admin_psswd_guest_computer |
| 17 | IT | admin_psswd_manager_computer |
| 14 | IT | admin_psswd_reception_computer |
| 8 | IT | psswd_guest_computer |
| 23 | IT | admin_psswd_wifi_router |
| 2 | IT | psswd_reception_computer |
| 5 | IT | psswd_manager_computer |
| 6 | guest_room_keys | key_room_103 |
| 21 | guest_room_keys | key_room_203 |
| 18 | guest_room_keys | key_room_202 |
| 27 | guest_room_keys | key_room_205 |
| 15 | guest_room_keys | key_room_201 |
| 3 | guest_room_keys | key_room_102 |
| 12 | guest_room_keys | key_room_105 |

TABLE 2-continued

Application-Entitlement

|    | Application     | Entitlement           |
|----|-----------------|-----------------------|
| 24 | guest_room_keys | key_room_204          |
| 9  | guest_room_keys | key_room_104          |
| 0  | guest_room_keys | key_room_101          |
| 31 | other_keys      | key_sauna             |
| 37 | other_keys      | key_entrance          |
| 25 | other_keys      | key_reception_desk    |
| 40 | other_keys      | key_kitchen           |
| 34 | other_keys      | key_storage_room      |
| 28 | other_keys      | key_swimming_pool     |
| 16 | other_keys      | key_technician_office |
| 19 | other_keys      | key_roof              |
| 43 | other_keys      | key_equipment_cupboard|
| 13 | other_keys      | key_boilers_room      |
| 10 | other_keys      | key_basement          |
| 7  | other_keys      | Key_managers_office   |
| 4  | other_keys      | Key_reception_office  |
| 1  | other_keys      | Key_janitorial_room   |
| 22 | other_keys      | Key_cleanign_cupboard |
| 46 | other_keys      | Key_electrical board  |

Table 3 illustrates an example of an business unit-entitlement relationship for a subset of the data.

TABLE 3

Business Unit-Entitlement

|    | Business Unit | Employee         |
|----|---------------|------------------|
| 1  | FullTime      | reception_1      |
| 4  | FullTime      | reception_2      |
| 7  | FullTime      | janitor_1        |
| 10 | FullTime      | janitor_2        |
| 13 | FullTime      | senior_janitor_1 |
| 16 | FullTime      | senior_janitor_2 |
| 19 | FullTime      | security_1       |
| 22 | FullTime      | security_2       |
| 0  | Management    | manager          |
| 3  | Management    | deputy_manager   |
| 2  | PartTime      | IT_expert        |
| 5  | PartTime      | gardener         |

TABLE 3-continued

Business Unit-Entitlement

|    | Business Unit | Employee     |
|----|---------------|--------------|
| 8  | PartTime      | technician_1 |
| 11 | PartTime      | technician_2 |

Table 4 illustrates an example of merged data relationships for a subset of the data.

TABLE 4

Merged Data Relationships

|   | Employee       | Entitlement        | BU         | Application |
|---|----------------|--------------------|------------|-------------|
| 0 | manager        | key_managers_office| Management | other_keys  |
| 1 | deputy_manager | key_managers_office| Management | other_keys  |
| 2 | manager        | key_entrance       | Management | other_keys  |
| 3 | deputy_manager | key_entrance       | Management | other_keys  |
| 4 | reception_1    | key_entrance       | FullTime   | other_keys  |

In some embodiments, the clustering for the IT roles may be performed via first diving the entitlements by application, and clustering each application separately. This is forced as the definition of the IT roles suggest.

Moreover, clustering may occur in layers. Meaning roles are created with different strength of bounds between entitlements. Some roles at higher (looser) hierarchies will fully maintain lower hierarchy roles. In some embodiments, this may be implemented to address the business need with respect to how IAM visions IT roles.

Table 5 illustrates an example of a clustering of IT roles. The table represents cluster IDs per entitlement in different hierarchies (thresholds for similarity). As one can see, keys for 1st floor rooms are clustered separately for thr 0.00, and 0.10, but later they are merged together with rooms of the 2nd floor. This is because for this example, some janitors are specialized by floor.

TABLE 5

Clusters per Entitlement

|    | Entitlement           | Application | Cluster_index_thr_0.00 | Cluster_index_thr_0.10 | Cluster_index_thr_0.20 | Cluster_index_thr_0.30 | Cluster_index_thr_0.40 |
|----|-----------------------|-------------|------------------------|------------------------|------------------------|------------------------|------------------------|
| 0  | key_basement          | other_keys  | 5                      | 5                      | 1                      | 1                      | 1                      |
| 1  | key_boilers_room      | other_keys  | 5                      | 5                      | 1                      | 1                      | 1                      |
| 2  | key_cleaning_cupboard | other_keys  | 2                      | 2                      | 5                      | 5                      | 5                      |
| 3  | key_electrical_board  | other_keys  | 7                      | 7                      | 7                      | 7                      | 7                      |
| 4  | key_entrance          | other_keys  | 8                      | 8                      | 8                      | 8                      | 0                      |
| 5  | key_equipment_cupboard| other_keys  | 9                      | 9                      | 4                      | 4                      | 4                      |
| 6  | key_janitorial_room   | other_keys  | 2                      | 2                      | 5                      | 5                      | 5                      |
| 7  | key_kitchen           | other_keys  | 6                      | 6                      | 6                      | 6                      | 6                      |
| 8  | key_managers_office   | other_keys  | 3                      | 3                      | 3                      | 3                      | 3                      |
| 9  | key_receiption_desk   | other_keys  | 0                      | 0                      | 2                      | 2                      | 2                      |
| 10 | key_reception_office  | other_keys  | 0                      | 0                      | 2                      | 2                      | 2                      |
| 11 | key_roof              | other_keys  | 5                      | 5                      | 1                      | 1                      | 1                      |
| 12 | key_sauna             | other_keys  | 1                      | 1                      | 0                      | 0                      | 0                      |
| 13 | key_storage_room      | other_keys  | 10                     | 10                     | 0                      | 0                      | 0                      |
| 14 | key_swimming_pool     | other_keys  | 1                      | 1                      | 0                      | 0                      | 0                      |
| 15 | key_technician_office | other_keys  | 4                      | 4                      | 1                      | 1                      | 1                      |

TABLE 5-continued

Clusters per Entitlement

|   | Entitlement | Application | Cluster_index_thr_0.00 | Cluster_index_thr_0.10 | Cluster_index_thr_0.20 | Cluster_index_thr_0.30 | Cluster_index_thr_0.40 |
|---|---|---|---|---|---|---|---|
| 0 | admin_psswd_guest_computer | IT | 1 | 1 | 1 | 1 | 1 |
| 1 | admin_psswd_manager_computer | IT | 1 | 1 | 1 | 1 | 1 |
| 2 | admin_psswd_receiption_computer | IT | 1 | 1 | 1 | 1 | 1 |
| 3 | admin_psswd_wifi_router | IT | 1 | 1 | 1 | 1 | 1 |
| 4 | psswd_guest_computer | IT | 0 | 0 | 0 | 0 | 0 |
| 5 | psswd_receiption_computer | IT | 0 | 0 | 0 | 0 | 0 |
| 6 | psswd_wifi_router | IT | 2 | 2 | 2 | 0 | 0 |
| 0 | key_room_101 | guest_room_keys | 1 | 1 | 0 | 0 | 0 |
| 1 | key_room_102 | guest_orom_keys | 1 | 1 | 0 | 0 | 0 |
| 2 | key_room_103 | guest_orom_keys | 1 | 1 | 0 | 0 | 0 |
| 3 | key_room_104 | guest_room_keys | 1 | 1 | 0 | 0 | 0 |
| 4 | key_room_105 | guest_room_keys | 1 | 1 | 0 | 0 | 0 |
| 5 | key_room_201 | guest_room_keys | 0 | 0 | 0 | 0 | 0 |
| 6 | key_room_202 | guest_room_keys | 0 | 0 | 0 | 0 | 0 |
| 7 | key_room_203 | guest_room_keys | 0 | 0 | 0 | 0 | 0 |
| 8 | key_room_204 | guest_room_keys | 0 | 0 | 0 | 0 | 0 |
| 9 | key_room_205 | guest_room_keys | 0 | 0 | 0 | 0 | 0 |

Figure 5A:
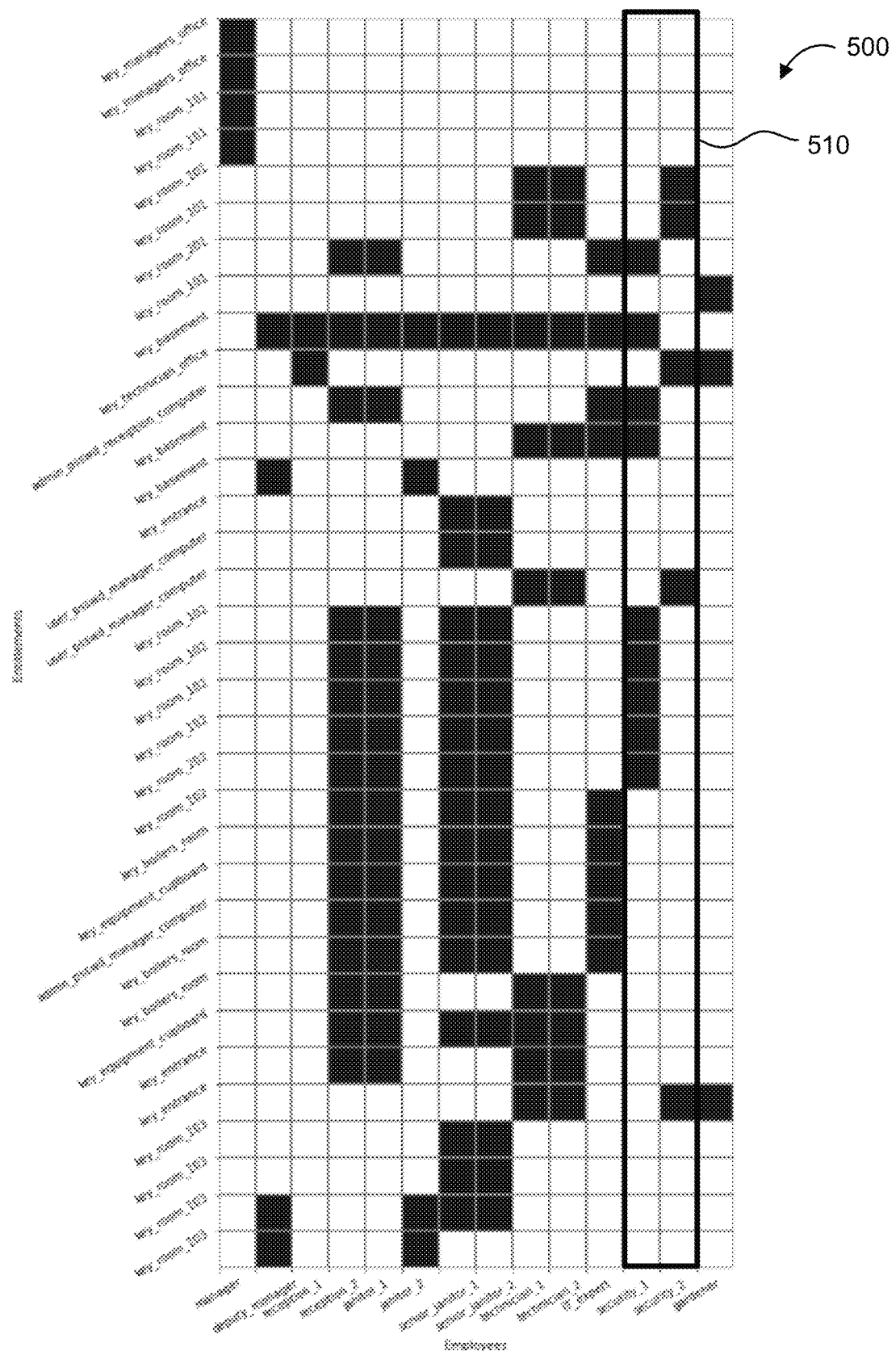
FIGS. 5A and 5B illustrate graphical representations of entitlement matrices directed to defining entitlements, in accordance with embodiments of the present disclosure.
Figure 5B:
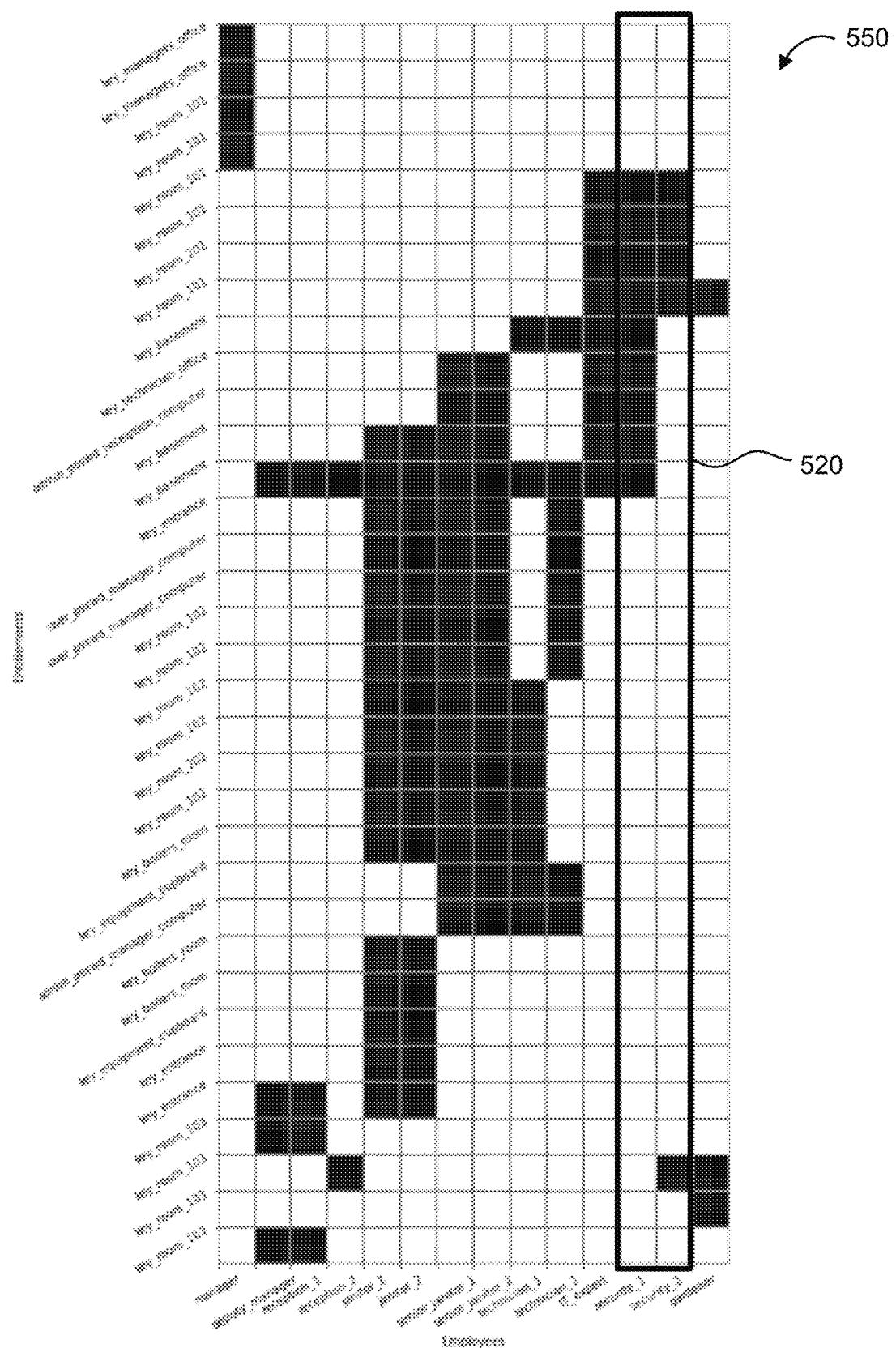

Reference is made to FIGS. 5A and 5B, which illustrate graphical representations 500, 550 of entitlement matrices directed to defining entitlements to resources for respective identities, in accordance with embodiments of the present disclosure.

As an example, FIG. 5A may illustrate a plurality of identities along an X-axis and a plurality of entitlements to access-controlled resources along a Y-axis. Granted access entitlements for respective identities may be illustrated by the shaded boxes.

FIG. 5A may represent identity-entitlement that may have been developed on an ad hoc or manual basis. The data set illustrated in FIG. 5A may have been generated based on adding entitlements based on user requests over time. For example, a user identified as security_1 and a user identified as security_2 are shown to have non-overlapping entitlements, despite the users identified as security_1 and security_2 may be colleagues conducting similar roles. The portion of the graphical representation 500 illustrating the entitlements for users identified as security_1 and security_2 are identified by a rectangular shape 510. The identified non-overlapping entitlements described above is an illustrating example, and other examples may be identified in FIG. 5A of non-overlapping entitlements associated with identifiers having common roles.

In the example scenario illustrated in FIG. 5A where entitlements associated with user identities may have been generated on an as-needed basis, user entitlements may need to be revised over time such that identities having common roles converge to be assigned a substantially common combination of entitlements to access-controlled resources.

In FIG. 5B, entitlements associated with identities identified as security_1 and security_2 are outlined by the rectangular shape 520 for illustrating entitlement assignments based on embodiments of methods for predicting or generating access entitlements to access-controlled resources, as described in the present disclosure. For example, the entitlements associated with the role "security" (e.g., including security_1 and security_2) may be assigned based on identification of combinations of entitlements based on clustering operations directed to converging on role-entitlements.

The example illustrated in FIGS. 5A and 5B focus on the identities security_1 and security_2; however, it may be appreciated that other example entitlement assignment efficiencies associated with other identities may be shown.

In some scenarios, multi-assignment clustering may include operations for generating overlapping clusters. However, multi-assignment clustering methods may be unoptimal for having clusters containing other clusters (e.g., sub-clusters within a higher-level cluster) or overriding other clusters. It may be desirable to provide systems and methods of layered clustering operations for generating hierarchies associated with roles for an organization.

As an example, some organizations may be structured to include roles based on a hierarchical nature. Entitlements e1 and e2 may be required to provide a user with read-access to a particular computing resource, and entitlements e3 and e4 may be required to provide a user write access to the particular computing resource. In the present example, a combination of the e1 and e2 entitlements may be defined as role R1, and a combination of e1, e2, e3, and e4 entitlements may be defined as role R2. Accordingly, user entitlements may be granted based on R1 for read-only access or R2 for read and write access to the particular computing resources. Role R2 is an example associated with entitlements that may contain the entitlements associated with role R1.

It may be desirable to provide methods for generating role-entitlement data sets based on clustering operations directed to a plurality of iterations for providing clustered entitlement output. In some scenarios, it may be useful to provide clustered entitlement output based on hierarchy variations, which may be combined to more fulsomely represent user roles. For example, role-entitlements associated with select hierarchical levels may include or be combined with role-entitlements of earlier or previous hierarchical levels.

In some embodiments, systems and methods may include operations and features of agglomerative clustering. As an initial state, an entitlement or user identity may be initialized as a cluster. Subsequently, pairs of clusters may be iteratively merged as operations advance towards subsequent hierarchies. In some embodiments, hierarchies may be defined based on an identified distance threshold parameter, which may represent a similarity measure for clustering user identities or entitlements. For example, the similarity measure may be directed to determining whether combinations of entitlements or user identifiers be classified as a cluster. Further, operations may include hyper parameters directed to determining how similarity may be identified among users or entitlements, and to determining distance measures between sets of similarity observations.

Figure 6A:
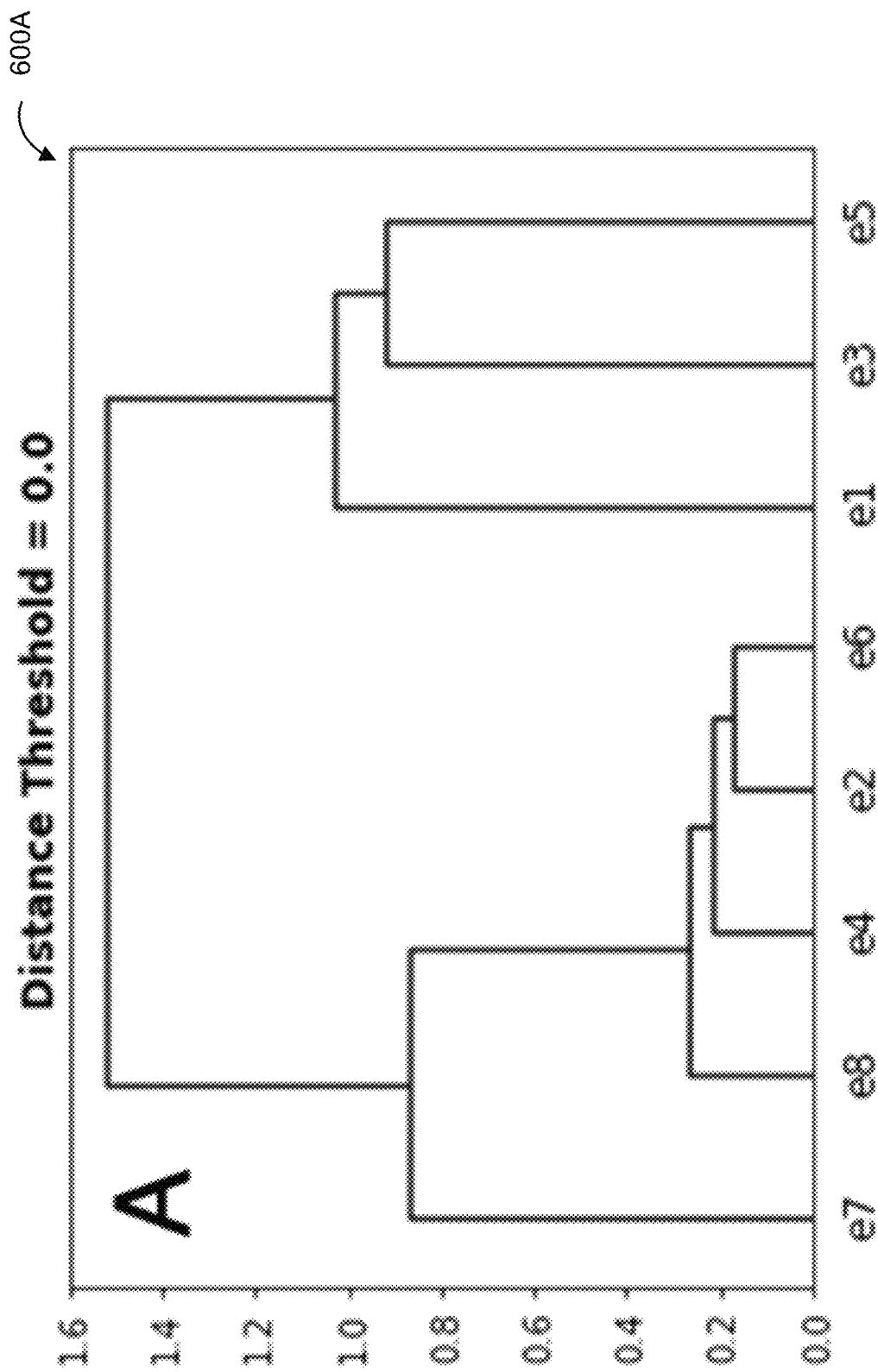
Figure 6C:
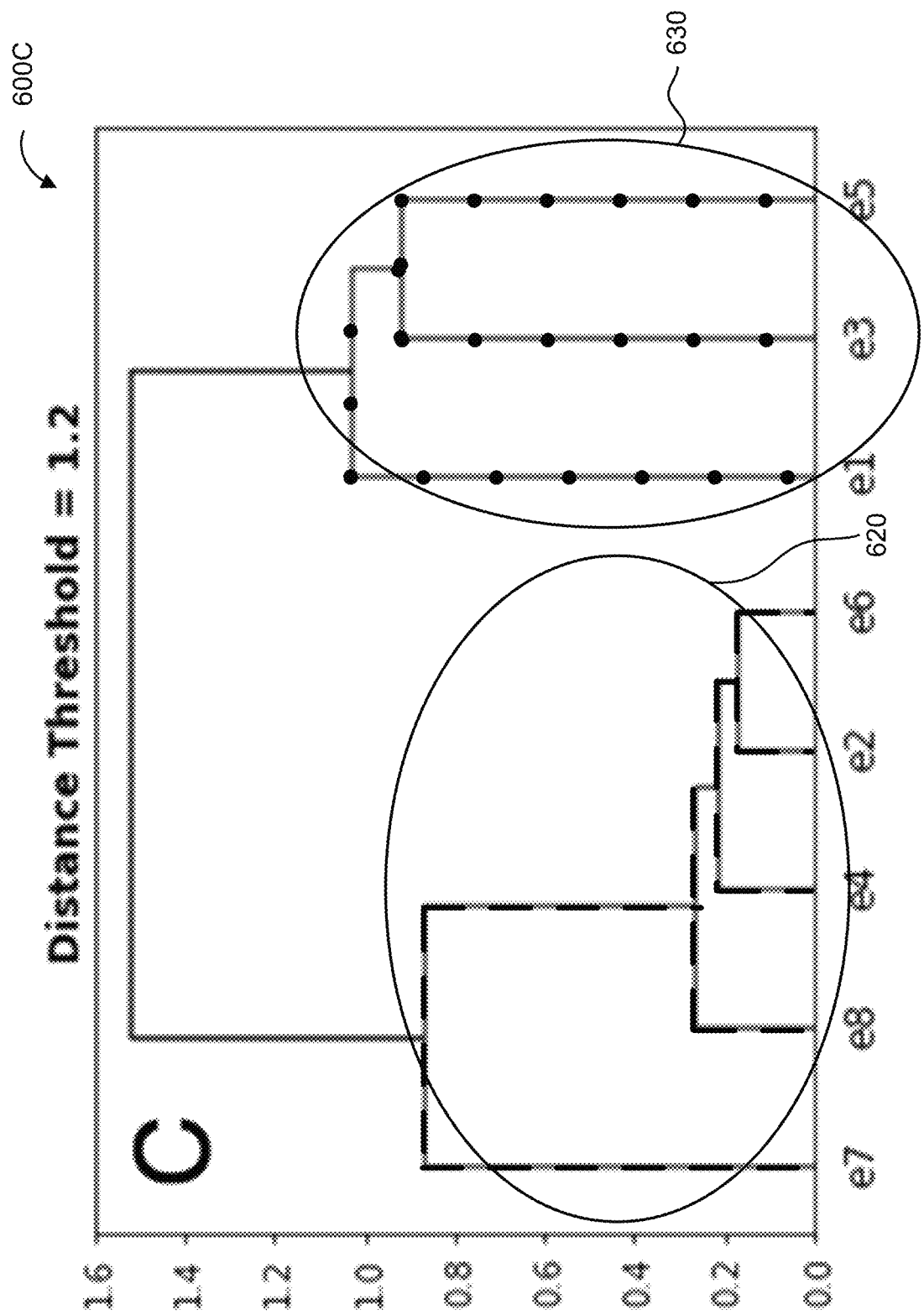

Reference is made to FIGS. 6A, 6B, and 6C, which illustrate a series of dendrograms 600A, 600B, 600C attribute distances between pairs of merged clusters based on hierarchical clustering operations, in accordance with embodiments of the present disclosure. In particular, FIGS. 6A to 6C illustrate embodiments of operations for agglomerative clustering for role mining described herein. Dendrograms are provided for illustration in FIGS. 6A to 6C, however, other types of graph-based representations for defining cluster representations of entitlement similarities may be used.

In FIGS. 6A to 6C, the horizontal (e.g., x-axis) represent entitlement identifiers, e1 to e8, while vertical (e.g., y-axis) represent distance measures between entitlements for various hierarchical levels.

In the illustrated example, the clustering operations may be applied at distance thresholds of 0.0, 0.3, and 1.2 in FIGS. 6A, 6B, and 6C, respectively.

In FIG. 6B, dashed lines (collectively identified with reference numeral 610) highlight outlined entitlements clustered together for the given hierarchical level.

In FIG. 6C, the diagram represents a further hierarchical level subsequent to that associated with FIG. 6B, where a first set of dashed lines (collectively identified with reference numeral 620) highlight outlined entitlements clustered together for the present hierarchical level, and a second set of dashed lines (collectively identified with reference numeral 630) highlight outlined entitlements clustered together for this present hierarchical level. When viewed as a combination, FIGS. 6A to 6C illustrate entitlement clusters when considered across a variation of hierarchical level.

Figure 7A:
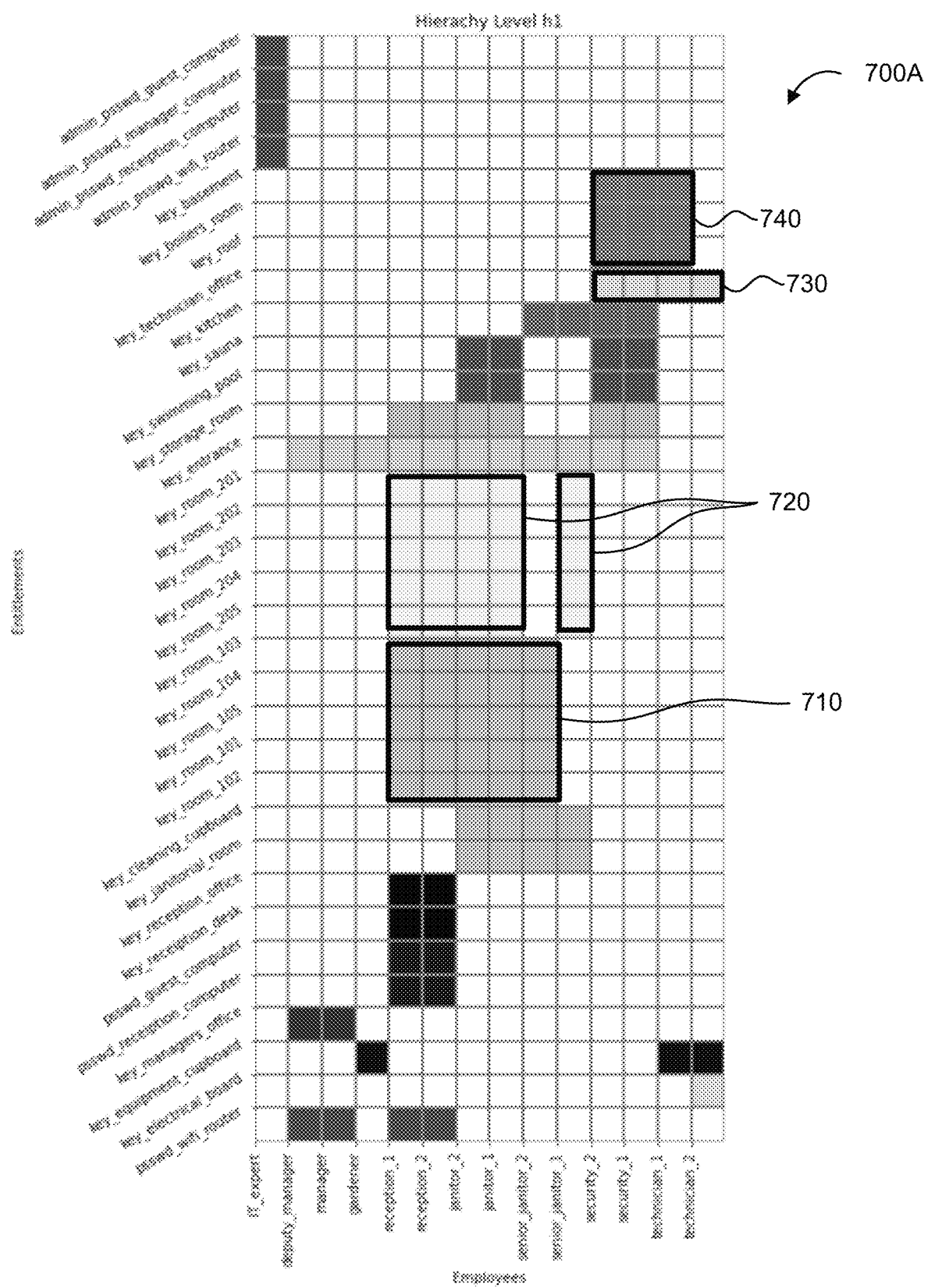
FIGS. 7A, 7B, and 7C illustrate graphical representations of identity-entitlement data sets over progressive hierarchical levels, in accordance with embodiments of the present disclosure.
Figure 7B:
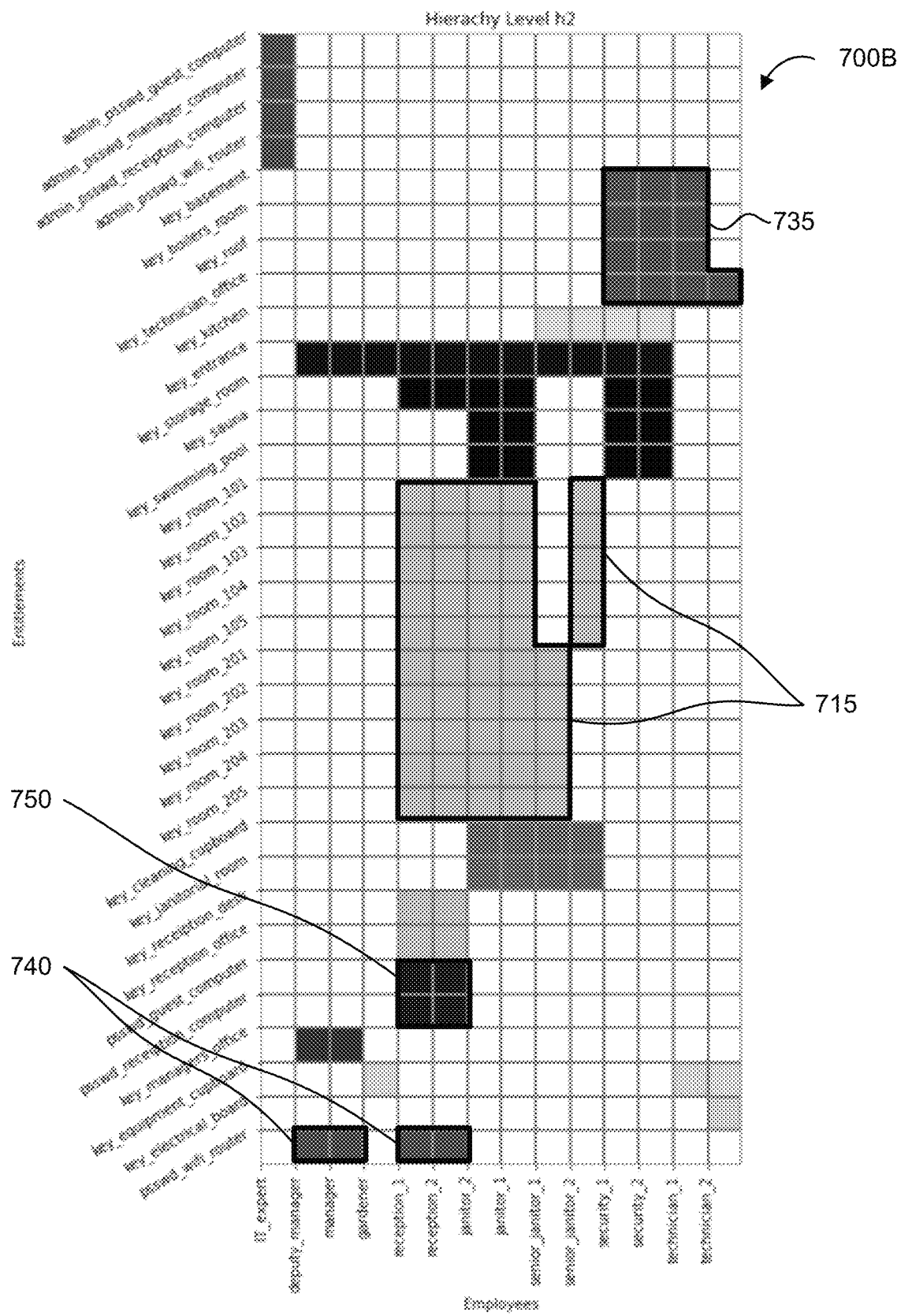
Figure 7C:
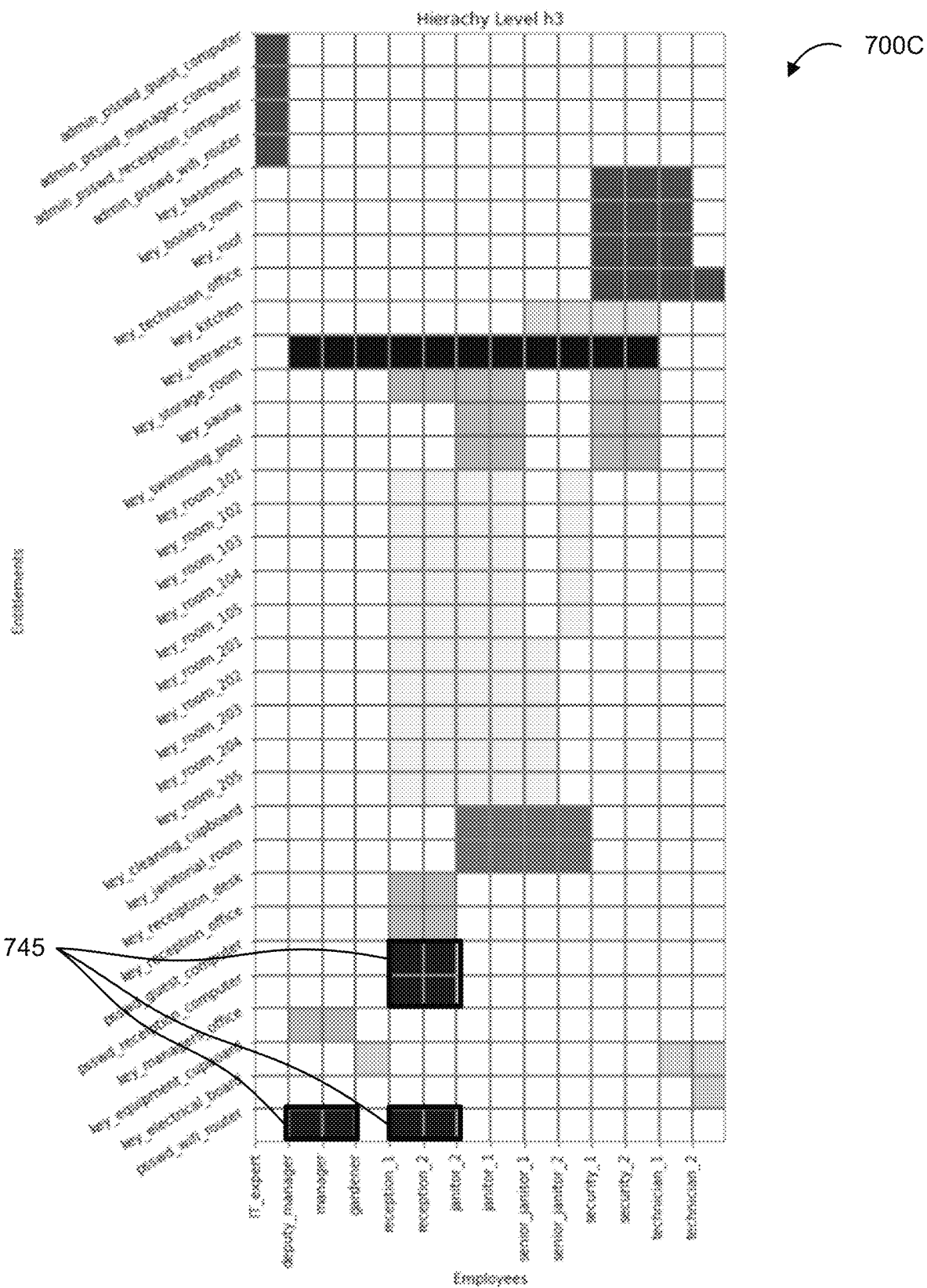

FIGS. 7A, 7B, and 7C illustrate a graphical representation 700A, 700B, 7000 of identity—entitlement data sets over progressive hierarchical levels, in accordance with embodiments of the present disclosure.

For example, FIGS. 7A to 7C illustrate a graphical representation of identity-entitlement data sets based on operations for role mining described in the present disclosure. In the respective drawings, identifiers for respective users are listed along the horizontal axis, and entitlements to access-controlled resources are listed along the vertical axis. FIGS. 7A to 7C illustrate examples of identity-entitlement relationships across three progressive hierarchies.

In viewing FIGS. 7A and 7B together, a first cluster of entitlements 710 and a second cluster of entitlements 720 in a first hierarchical level are combined to provide a third cluster of entitlements 715 in a second hierarchical level (FIG. 7B).

In another example, a fourth cluster of entitlements 730 and a fifth cluster of entitlements 740 in a first hierarchical level are combined to provide a sixth cluster of entitlements 735 in a second hierarchical level (FIG. 7B).

In viewing FIGS. 7B and 7C together, a seventh cluster of entitlements 740 and an eight cluster of entitlements 750 in a first hierarchical level are combined to provide a ninth cluster of entitlements 745 in a second hierarchical level (FIG. 7C).

As illustrated in some scenarios, operations including features of agglomerative clustering of identity-entitlements of a sub-set of users may at progressively higher hierarchical levels combine with identity-entitlements of prior or lower hierarchical levels.

In some embodiments, entitlements to access-controlled resources may be generated based on user identity names within an organization. In some embodiments, embodiments of systems and methods described herein may include generating access entitlements based on natural language descriptions of user roles. It may be desirable to provide methods of determining whether such natural language descriptions of user roles are objectively coherent or comprehensive for embodiments of the system 100 (FIG. 1) to generate identifier-entitlement data sets for users. In some embodiments, the system 100 may be configured to determine based on received natural language input whether such descriptions may have been inappropriately copied, thereby triggering downstream scrutiny prior to generating the requested entitlements.

In some embodiments, the entitlement application 112 may include operations for evaluating entitlement descriptions based on a combination of some statistics (e.g., analysis of number of words in the entitlement description) and jargon detection operations. Entitlement description evaluator may be configured to detect acronyms or initialisms and attempt to determine an explanation, for example, identifying "FBI" as an appropriate initialism from a use such as "The Federal Bureau of Investigation, or FBI." If no explanation is found, the acronym may be flagged as jargon.

In some embodiments, to enhance or bolster assessments of entitlement description quality, the entitlement application 112 may include operations to cluster entitlements with similar descriptions for identifying non-descript groups of entitlement/requests (e.g., distinct entitlements for which the same definition is provided), making it difficult for the user to understand how one privilege differs from another. Specifically, respective descriptions may be represented as an average of its main word embeddings prior to operations of a density-based clustering algorithm (ex. DBSCAN). Quality of the cluster, cluster score, may subsequently be assessed based on both the most common words in the cluster and the average description length. Accordingly, the entitlement application 112 may include operations to identify descriptions that may be variations of one another.

In some scenarios, prevalence of an entitlement associated with an access-controlled computing resource may provide additional information on an anomalous nature of an entitlement within an organization. As entitlements are typically associated within an access-controlled computing resource, determining distributions of such entitlements may illustrate a criticality of access to such access-controlled computing resource.

Figure 8:
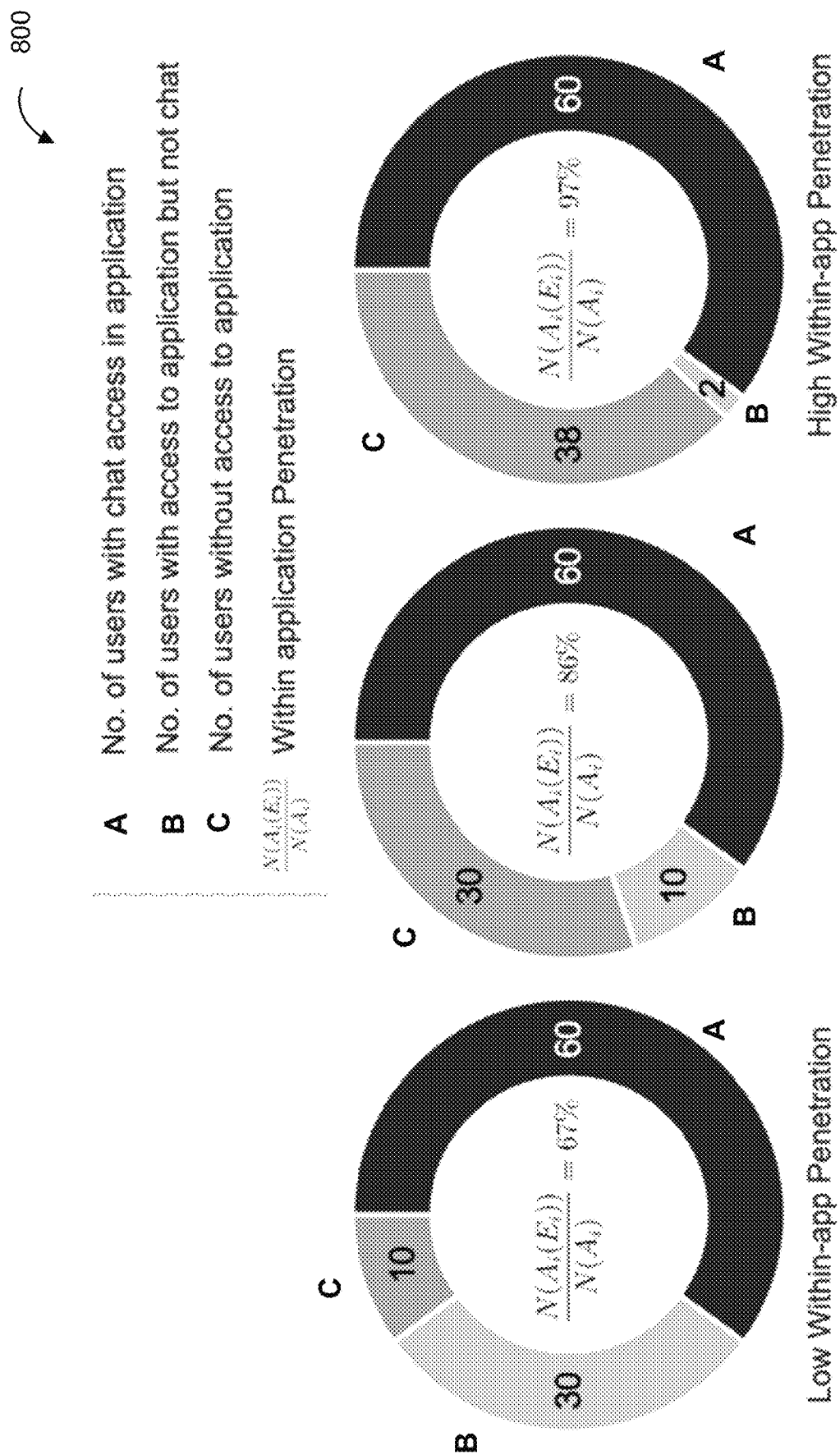
FIG. 8 illustrates charts showing varying within-application penetrations, in accordance with embodiments of the present disclosure.

Reference is made to FIG. 8, which illustrates charts 800 showing varying within-application penetrations, in accordance with embodiments of the present disclosure. In FIG. 8, the three scenarios have different distributions of a particular access entitlement, which may be an ability to engage in chat in a telecommunications tool. While the distributions of the entitlement differ across the three scenarios (e.g., 67%, 86%, and 97%), equation (2) described in the present disclosure provides identical scores as their penetration across the organization remains unchanged.

In some embodiments, the expression within-application penetration may be defined as a ratio of a number of users who are associated with a particular entitlement (identified with reference letter "A" in FIG. 8) within a specific application to a total number of users with access to the application (e.g., summation of portions identified with reference letters "A" and "B" in FIG. 8).

In FIG. 8, each circular chart represents a scenario of a distribution of users with: access to a chat feature within an application (A), access to the application but not the chat feature (B), and no access to the application (C). In scenarios where only hierarchical prevalence for attestation scores is considered, equation (2) may provide identical outputs for the three varying scenarios. In the above-described scenarios, the number of users having access to the entitlement within a hierarchy may be 60%. However, the ratio of users engaged in the chat feature to the number of users having access to the application may vary across the three scenarios. For instance, the percent of population having access to the application may be 90%, 70%, 62% for the charts on the left, middle, and right hand sides, respectively, despite being associated with an identical entitlement penetration.

It may be desirable to consider an additional weighting term for determining an anomalous nature of entitlements to computing resources.

In some embodiments, equation (2) may be revised to add a corrective term to statistical modelling to account for within application penetration, thereby including an additional perspective for providing an attestation score. Revised equation (2) may be provided as equation (2a) below:

$$R_{h_i}(E) = \left[1 - \left(\frac{N(E)}{T} \times \frac{N(TR_{(E_i)})}{TR} \times \frac{N(E)}{N(A)}\right)\right] \times (T - N(E)) \quad (2a)$$

where N(A) represents a number of people within the organization with the application associated with the entitlement.

In the illustrated scenarios of FIG. 8, the chart on the right-side of the page shows a greater percentage of users having access to the entitlement. Thus, the entitlement may be identified as "less anomalous" than in a situation where a lower percentage of users within an application has access to the application, despite being associated with a substantially similar penetration within an overall hierarchy.

In some embodiments, revising equation (2a) with an additional layer considering the overall prevalence of the application within the organization may provide greater granular entitlement review processes. For example, including a unique within-application access (low percentage of people granted access within the application) in a widely common application may require additional attestation for determining an anomalous nature of that entitlement.

Further, a user having basic entitlements to a particular sub-group's database (e.g. common within a group of users that may be granted to a resource application) may be corrected to be more benign for a sub-group's employee despite the database being relatively unique in the organization (e.g., only users within a sub-group may be granted the entitlement).

Accordingly, an attestation score associated with an anomalous nature of an entitlement to an access-controlled resource that not only reflects its prevalence among hierarchies, but also: (i) its prevalence within a resource application; and (ii) the prevalence of the application associated with the entitlement may have greater value.

As described in examples of the present disclosure, a given organization may include a large number of users, and respective users may be associated with various combinations of entitlements. It may be desirable to conduct operations to generate entitlement data sets representing access to resources for a new user.

In some scenarios, it may be desirable to conduct operations to scrutinize entitlement data sets representing access to resources to quantify a likelihood that the respective entitlements are not unintended entitlement assignments.

In some scenarios, it may be desirable to conduct operations to dynamically generate updates to entitlement data sets associated with existing users based on generated entitlement data sets of new users.

In some scenarios, it may be desirable to provide model representations of entitlements associated with users for a given organization to reduce data processing inefficiencies associated with large data matrix representations of entitlement data sets.

Figure 9:
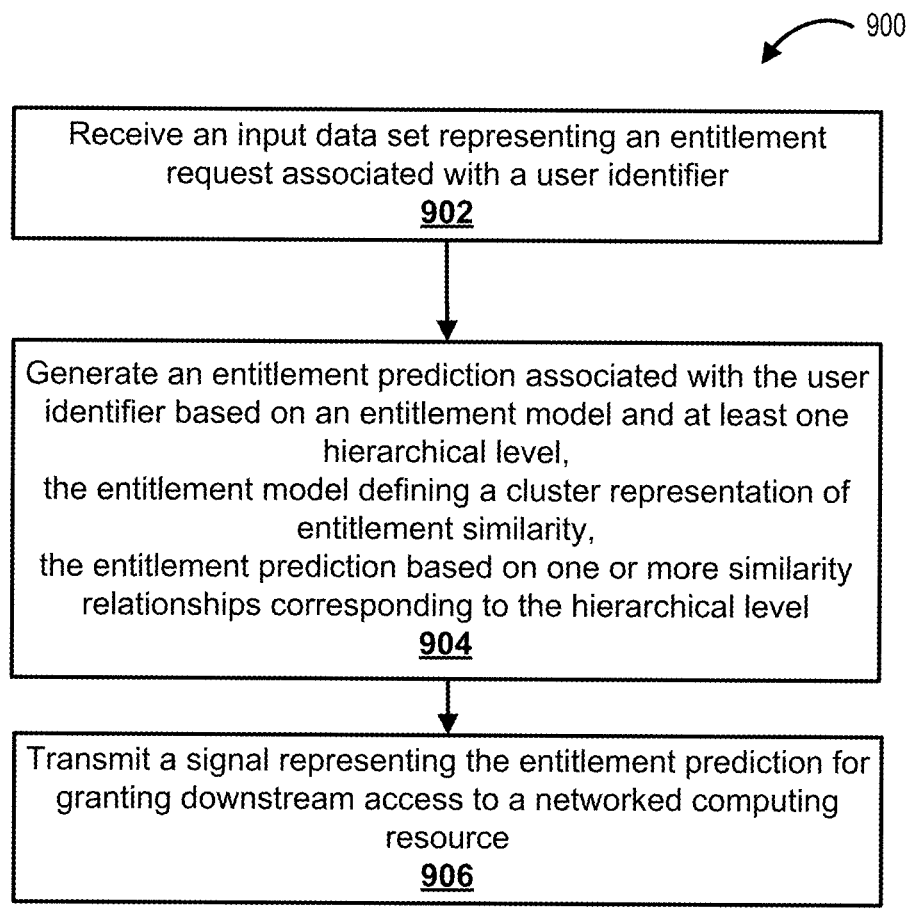
FIG. 9 illustrates a flow chart of a method for generating access entitlements to networked computing resources, in accordance with embodiments of the present disclosure.

Reference is made to FIG. 9, which illustrates a flow chart of a method 900 for generating access entitlements to networked computing resources, in accordance with embodiments of the present disclosure. The method 900 may be conducted by the processor 102 of the system 100 (FIG. 1). Processor-readable instructions may be stored in the memory 106 and may be associated with the entitlement application 112 or other processor readable applications not illustrated in FIG. 1. The method 900 may include operations, such as data retrievals, data manipulations, data storage, or the like, and may include other computer executable functions. The method 900 may be based on image data received from one or more of the client device 130 or the networked computing resource 160.

To illustrate features of embodiments, the system 100 may be associated with a banking institution, and the system 100 may be configured to be associated with access-controlled resources. Examples of access-controlled resources may include electronic mail servers, database servers, application servers, among other resources. The banking institution may configure computing systems for providing a plurality of users with entitlements, such as permissions, to access particular computing servers, applications, or devices. The entitlements may provide use access to electronic mail servers, electronic mailboxes associated with users, or entitlements to access collaboration tools, such as instant-messaging applications, document management repositories and files stored thereon, or licensed software applications, among other examples of networked computing resources.

At operation 902, the processor may receive an input data set representing an entitlement request associated with a user identifier.

In some embodiments, the entitlement request may be associated with a new user of the organization. The entitlement request may include particulars about the new user, such as requested resource access requirements, user role within the organization, team on which the new user is a part of, among other details. The input data set may include a plurality of new user details, and the processor may conduct operations for distilling the input data set to a request data set for downstream entitlement prediction operations. In some examples, operations may include identifying potential user roles based on the input data set associated with the user identifier. For instance, a retail client investment advisor may require functionality to software applications that may be different than functionality required by an stock market trader user.

In some embodiments, the entitlement request may be associated with a query on whether a given entitlement data set for a user identifier may include unintended or outdated entitlement assignments. In some scenarios, the query may be for identifying whether a particular user has been granted access to computing resources that a very small number of specialized users have access to, and for quantifying a likelihood that the respective entitlement is unintended. For example, the query may be configured to determine whether a user identifier for a student intern associated with "super user" administrative access to a database storing trade secret data is unintended.

In some scenarios, the query may be for identifying whether one or a group of users may be associated with a combination of access entitlements that may require updates. For example, the combination of access entitlements may have become incomplete over time (e.g., not including access entitlements to newly licensed software applications), or have become incongruent with updated policies of an organization (e.g., having access to a particular database, when updated policies have migrated data to a different database server).

In some embodiments, the entitlement request may be associated with a request to dynamically update entitlement data sets for a plurality of prior-identified users based on newly generated entitlement data sets for a new users. For example, a new user to an investment banking team may be provided with access to a newly licensed modelling software. The entitlement request may be for operations to determine whether the access to the newly licensed modelling software may be suitable for existing members of the investment banking team, such that operations may dynamically update entitlement data sets associated with existing user members without operations for individually updating entitlements for the respective existing team members.

At operation 904, the processor may generate an entitlement prediction associated with the user identifier. The entitlement prediction may be based on an entitlement model and at least one hierarchical level. The entitlement model may define a cluster representation of entitlement similarity. The entitlement prediction may be based on one or more similarity relationships corresponding to the at least one hierarchical level.

In some embodiments, the processor may determine at least one hierarchical level corresponding to the entitlement request, where the hierarchical level may be associated with a feature of the resource. As an illustrating example, the entitlement request may include at least one of read request or write request to an application server storing documents. Entitlements for providing read request may include application entitlements e1 and e2 (as examples), and providing write requests may include application entitlements e1, e2, e3, and e4 (as examples). Accordingly, the processor may determine that a hierarchical level for providing read requests may be "higher" or different than for providing write requests, and the required entitlements for read requests may be a subset of the combination of entitlements required for write requests.

Other scenarios for providing hierarchical levels may be used. As an illustrating example, hierarchical levels may be defined based on roles or responsibilities of a user within the given organization. The hierarchical levels may define a number of computing applications that the user may require. For example, a contracts administrator may require software applications for electronic mail, document and spreadsheet application, instant communication applications, among other example software applications. An executive member of the management team, in contrast, may require access to all the software applications available to the contracts administrator and additionally to specific trade secret databases or banking modelling software, among other example applications. In the present example, the processor may determine a hierarchical level corresponding to the entitlement request.

The entitlement model may define a cluster representation of entitlement similarity among nodes representing user identifiers associated with prior-identified access entitlements. Referring again to FIG. 3, the graph-based representation of user identifier-entitlement data may represent a cluster representation of entitlement similarity among nodes representing user identifiers. In FIG. 3, the respective groupings of nodes may represent user identifiers that may be associated with common access entitlements to resources (e.g., substantially similar set of access to servers, databases, software applications, etc.).

In some other embodiments, the entitlement model may define a cluster representation of entitlement similarity among nodes representing prior-identified access entitlement similarities among corresponding user identifiers. For example, the graph-based representation of FIG. 3 may be revised such that the respective nodes represent software applications (e.g., e-mail application, instant chat application, financial modeling software, etc.), and the edges joining respective pairs of nodes may represent the relationship among applications on which user access may be granted.

In another example, the graph-based representation of FIGS. 6A to 6C may define cluster representation of entitlement similarity for various hierarchical levels. In some scenarios, the various hierarchical levels may be defined by distance threshold parameters among the entitlements (e.g., entitlements clustered together for a given hierarchical level).

In some embodiments, the entitlement prediction may define one or a set of access entitlements for a user identifier to a plurality of resources. In some embodiments, the entitlement prediction may generate a prediction of a role type or category for the user identifier, such that the prediction provides an entitlement data set based on other users having a similar role to the subject new user identifier.

In some embodiments, the entitlement model may be based on generating graph-based representations of user-entitlement data sets. The user-entitlement data sets may be provided in a matrix data set format, where users may be represented as rows, and access entitlements may be represented as columns. The matrix data set may represent within respective rows the combination of access entitlements for the respective user. In scenarios where the data set may be large (e.g., numerous users) and the number of possible entitlements may be large (e.g., every possible discretely defined access to a resources), the matrix may have numerous rows and columns and may have large amounts of 'negative space'. Examples of negative space may include "0" values denoting that the user does not have access to particular resources.

To reduce computational resources that may be required to generate or represent similarities among users associated with entitlements, embodiments of entitlement models may be provided. The entitlement models may be based on graph-based representations of user-entitlement data sets. For example, the entitlement models may be based on graph-based representations show in FIG. 3 (e.g., nodes and edges), or FIGS. 6A to 6C (e.g., similarities of entitlements).

In some embodiments, the entitlement models may provide cluster representations of entitlement similarity based on Markov clustering operations to provide groupings of users (e.g., nodes of FIG. 3) having similar access entitlements, as described in examples of the present disclosure. For example, the graph-based representation may include a plurality of nodes respectively representing user identifiers, and edges connecting pairs of nodes and associated with weights representing entitlement similarity among respective pairs of nodes.

Continuing with the example, the weights representing similarity among the pairs of nodes my be based on:

$$W_{ij} = \sum_{k=0}^{N} A_{ik} A_{jk} \frac{\overline{L}}{L_i} \times \frac{\overline{O}}{O_k} + \sum_{k=0}^{N} A_{ik} A_{jk} \frac{\overline{L}}{L_j} \times \frac{\overline{O}}{O_k}$$

where L represents the load (number of entitlements) of identity i or identity j, and O represents the occurrence (number of identities) of entitlement k.

In some embodiments, the entitlement model including a cluster representation of entitlement similarity may be tuned based on parameters. With examples of Markov clustering operations, tunable parameters for providing clustering representations include inflation parameters or expansion parameters. For example, the tuned parameters may provide for varying granularity of the resulting clusters, or to allow flow to group or connect various regions of a graph-based representation.

In some embodiments, the entitlement models may provide cluster representations of entitlement similarity based on agglomerative clustering, and configured to represent clusters of entitlements based on similarity. Such examples may include dendogram representations associated with combinations of entitlements to resources. For example, dendrograph representations may be configured to illustrate attribute distances between respective pairs of sequentially merged entitlements (see e.g., FIGS. 6A to 6C).

As an illustrating example, operations of agglomerative clustering to provide the entitlement models may include grouping combinations of entitlements based on a prior-identified hierarchical level from the entitlement request.

In scenarios where the entitlement request may be associated with a query on whether a given entitlement data set for a user identifier may include unintended or outdated entitlement assignments, the processor may generate an attestation value to quantify the entitlement prediction relative to nodes of the cluster representation associated with the prior-identified access entitlements.

As a simple example, attestation values may be scores for providing a relative quantification of a likelihood that a particular or a combination of access entitlements for a user identifier may be unintended. An unintended entitlement may include access to specialized or specific servers that are not broadly provided to users of an organization. As shown in FIG. 2, example attestation values may be numerical values on a scale of 0 to 1, where a value closer to 1 may indicate that the particular entitlement value may require scrutiny to ensure the provided entitlement to a user is intended. An attestation value closer to 0 may be assigned for entitlements that are more commonly provided to a majority of users across the given organization.

In some embodiments, the processor may determine whether the attestation value satisfies a trigger condition. A trigger condition may be a threshold value for indicate that further scrutiny for a provided entitlement prior to downstream operations for the user to access the particular resource. Referring again to FIG. 2, the trigger condition may include a threshold value of 0.5, where application entitlements assigned an attestation value of greater than 0.5 may require further operations for auditing entitlements.

In some embodiments, the entitlement prediction may include an indication, based on a generated attestation value, whether to propagate the access entitlement to provide access to the networked computing resource. In scenarios where the processor determines that an entitlement dataset based on an entitlement prediction meets a trigger condition, the processor may allow signals for accessing networked computing resources for the user identifier to be processed.

In scenarios where the processor may determine that an entitlement dataset based on an entitlement prediction may not meet a trigger condition, the processor may delay assignment of access entitlements to the user identifier. In some embodiments, the processor may transmit a signal for displaying on a client device 130 that the entitlement dataset may not meet a trigger condition, and prompt a user to provide feedback on whether to provide access entitlements. In some embodiments, the processor may conduct downstream operations to determine based on additional inputs whether the entitlement prediction may conform to intended entitlement grants for particular computing resources.

In some embodiments, an attestation value may be determined based on:

$$R_{h_i}(E) = \left[1 - \left(\frac{N(E)}{T} \times \frac{N_{h_i}(E)}{h_i}\right)\right] \times [T - N(E)]$$

where N(E) represents a quantity of user identifiers being associated with a given entitlement, T represents a total quantity of user identifiers, $N_{h_i}(E)$ represents a total quantity of user identifiers associated with the given entitlement in that given hierarchical level, and $h_i$ is a total quantity of user identifiers associated with the given hierarchy level.

In some embodiments, the attestation value may be weighted based on a ratio of a quantity of user identifiers being associated with a given entitlement for the given networked computing resource to a number of user identifiers associated with the networked computing resource. For example, the attestation value formulation of equation 2 (disclosed herein) may be revised to provide the following:

$$R_{h_i}(E) = \left[1 - \left(\frac{N(E)}{T} \times \frac{N(TR_{(E_i)})}{TR} \times \frac{N(E)}{N(A)}\right)\right] \times (T - N(E)) \quad (2a)$$

where N(A) represents a number of people within the organization with the application associated with the entitlement.

At operation 906, the processor may transmit a signal representing the entitlement prediction for granting downstream access to a networked computing resource.

In some embodiments, the signal may include an entitlement data set defining the accesses granted to the user identifier/user. The entitlement data set may be utilized for setting up user profiles for a new user of an organization.

In some embodiments, the signal representing the entitlement prediction may include an attestation value to quantify the entitlement prediction relative to other prior-identified entitlements. In scenarios where the attestation value may indicate that further scrutiny of particular entitlement values may be warranted to determine whether any entitlement grants were unintended, the processor may delay downstream operations to propagate or allow the access entitlements to the particular user identifier. In some embodiments, the signal may be transmitted for displaying on a user interface the recommendation to conduct further operations to scrutinize the predicted or provided entitlement values.

In scenarios where the attestation value may indicate that the entitlement values are associated with a cluster of other users having similar entitlements, the processor may conduct operations to propagate the entitlement data set to allow accesses to networked computing resources associated with the user identifier.

In some embodiments, the signal representing the entitlement prediction may be provided to networked computing resources for downstream operations to update entitlement data sets associated with a plurality of other user identifiers within an organization of networked systems.

As described in the present disclosure, systems and methods may include operations to generate attestation values to quantify entitlement predictions relative to nodes of the cluster representation associated with prior-identified access entitlements.

In some embodiments, generated attestation values may be based on a combination of features. For example, attestation values may be based on a quantity or frequency of entitlement reviews. A given organization may conduct period reviews of access entitlement data sets to determine appropriateness of attestation for particular accesses. Entitlement accesses that are reviewed at a higher frequency may serve as an indicator that the entitlement possesses a higher attestation score (higher likelihood of potential unintended access grant to be monitored).

In some embodiments, level of approval and number of approvals before access granted may be determined and associated with an attestation value. For example, particular access entitlements to resources may require multiple approval stages within an organization before access is granted. The hierarchy of access approvals may serve as another lens of entitlement criticality. For example, an access to a database may require multiple levels of approval from senior management users, which would deem an access requiring more attention; the fact that it requires multiple access controls and from senior management deems it higher scrutiny.

In some embodiments, the attestation values may be based on a determined level of activity in association of an entitlement for the user. For example, users having numerous unused or unnecessary accesses may present unintended entitlement access paths within networked systems of an organization. Administrative privileges may be granted for users on a project and subsequently not rescinded upon user's completion. Over time, the networked systems may include multiple users being associated with unused access entitlements, which may contribute to increased unintended cybersecurity likelihood.

In some embodiments, the attestation values may be based on a trend in number of requests for an entitlement. For example, the system may receive an increasing quantity of entitlement requests for a particular entitlement, which may require further attention to ensure the impact it may have based volume granted at a given time (either from a outlier perspective or from a technical load perspective on the influx).

In some embodiments, the attestation values may be based on relative age of an access entitlement associated with a user identifier. For example, an active entitlement that has been granted for access to computing resources may be identified as common and more likely to be an intended entitlement grant based on the quantity of operations and rounds attestation checks it has been through. In contrast, out-dated entitlements may require operations for determining whether updates to the entitlement may be required based on current policies or implementations of the networked computing resources.

In some embodiments, an increasing quantity of entitlement requests for a particular access entitlement associated with a particular user identifier may cause operations to generate attestation values for suggesting potential unintended or suspicious activity, and providing additional scrutiny relating to entitlements for the particular user. In addition, where access entitlements are associated and granted with a user identifier following multiple rejections of the access entitlement may trigger additional downstream operations to evaluate whether the entitlement grant is intended.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present disclosure is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

The description provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

As can be understood, the examples described above and illustrated are intended to be exemplary only.

Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

What is claimed is:

1. A system for generating access entitlements to networked computing resources comprising:
    a processor;
    a memory coupled to the processor and storing processor-executable instructions that, when executed, configure the processor to:
        receive an input data set representing an entitlement request associated with a user identifier;
        generate an entitlement prediction associated with the user identifier based on an entitlement model and at least one hierarchical level, the entitlement model defining a cluster representation of entitlement similarity, and wherein the entitlement prediction is based on one or more similarity relationships corresponding to the at least one hierarchical level;
        generate an attestation value to quantify the entitlement prediction relative to nodes the cluster representation associated with the prior-identified access entitlements; wherein the entitlement prediction includes an indication, based on the attestation value, whether to propagate the access entitlement to provide access to the networked computing resource; and
        transmit a signal representing the entitlement prediction for granting downstream access to a networked computing resource.

2. The system of claim 1, wherein the entitlement prediction defines at least one of: an entitlement associated with the user identifier to provide access to the networked computing resource or a user role among a plurality of users associated with user identifiers.

3. The system of claim 1, wherein the entitlement similarity represented by the cluster representation is among nodes representing user identifiers associated with prior-identified access entitlements.

4. The system of claim 1, wherein the entitlement similarity represented by the cluster representation is among nodes representing prior-identified access entitlement similarities among corresponding user identifiers.

5. The system of claim 1, wherein the processor-executable instructions, when executed, configure the processor to:
    upon determining that the attestation value satisfy a trigger condition, triggering a downstream entitlement operation.

6. The system of claim 5, wherein the attestation value is based on:

$$R_{h_i}(E) = \left[1 - \left(\frac{N(E)}{T} \times \frac{N_{h_i}(E)}{h_i}\right)\right] \times [T - N(E)]$$

where N(E) represents a quantity of user identifiers being associated with a given entitlement, T represents a total quantity of user identifiers, $N_{h_i}(E)$ represents a total quantity of user identifiers associated with the given entitlement in that given hierarchical level, and $h_i$ is a total quantity of user identifiers associated with the given hierarchy level.

7. The system of claim 6, wherein the attestation value is weighted based on a ratio of a quantity of user identifiers being associated with a given entitlement for a given networked computing resource to a number of user identifiers associated with the networked computing resource.

8. The system of claim 1, wherein the processor-executable instructions, when executed, configure the processor to: determine at least one hierarchical level corresponding to the entitlement request, the at least one hierarchical level associated with a feature of the networked computing resource.

9. The system of claim 1, wherein the entitlement model includes tunable parameters for generating the cluster representation based on the at least one hierarchical level.

10. The system of claim 1, wherein the entitlement model is based on agglomerative clustering among nodes and similarity relationships associated with existing access entitlements.

11. The system of claim 1, wherein the entitlement model is based on Markov clustering associated with a graph-based representation of entitlement data sets, the graph-based representation including a plurality of nodes respectively representing user identifiers, and edges connecting pairs of nodes and associated with weights representing entitlement similarity among respective pairs of nodes.

12. The system of claim 11, wherein the weights representing similarity among the pairs of nodes is based on:

$$W_{ij} = \sum_{k=0}^{N} A_{ik} A_{jk} \frac{L}{L_i} \times \frac{\overline{O}}{O_k} + \sum_{k=0}^{N} A_{ik} A_{jk} \frac{L}{L_j} \times \frac{\overline{O}}{O_k}$$

where L represents the load (number of entitlements) of identity i or identity j, and O represents the occurrence (number of identities) of entitlement k.

13. A method for generating access entitlements to access-controlled computing resources comprising:
  receiving an input data set representing an entitlement request associated with a user identifier;
  generating an entitlement prediction associated with the user identifier based on an entitlement model and at least one hierarchical level, the entitlement model defining a cluster representation of entitlement similarity, and wherein the entitlement prediction is based on one or more similarity relationships corresponding to the at least one hierarchical level;
  generate an attestation value to quantify the entitlement prediction relative to nodes of the cluster representation associated with the prior-identified access entitlements; wherein the entitlement prediction includes an indication, based on the attestation value, whether to propagate the access entitlement to provide access to the networked computing resource; and
  transmitting a signal representing the entitlement prediction for granting downstream access to a networked computing resource.

14. The method of claim 13, wherein the entitlement prediction defines at least one of: an entitlement associated with the user identifier to provide access to the networked computing resource or a user role among a plurality of users associated with user identifiers.

15. The method of claim 13, wherein the entitlement similarity represented by the cluster representation is among nodes representing user identifiers associated with prior-identified access entitlements.

16. The method of claim 13, wherein the entitlement similarity represented by the cluster representation is among nodes representing prior-identified access entitlement similarities among corresponding user identifiers.

17. The method of claim 13, comprising:
  upon determining that the attestation value satisfy a trigger condition, triggering a downstream entitlement operation.

18. The method of claim 17, wherein the attestation value is based on:

$$R_{h_i}(E) = \left[1 - \left(\frac{N(E)}{T} \times \frac{N_{h_i}(E)}{h_i}\right)\right] \times [T - N(E)]$$

where N(E) represents a quantity of user identifiers being associated with a given entitlement, T represents a total quantity of user identifiers, $N_{h_i}(E)$ represents a total quantity of user identifiers associated with the given entitlement in that given hierarchical level, and $h_i$ is a total quantity of user identifiers associated with the given hierarchy level.

19. The method of claim 13, comprising: determining at least one hierarchical level corresponding to the entitlement request, the at least one hierarchical level associated with a feature of the networked computing resource.

20. A non-transitory computer-readable medium having stored thereon machine interpretable instructions which, when executed by a processor, cause the processor to perform a computer-implemented method comprising:
  receiving an input data set representing an entitlement request associated with a user identifier;
  generating an entitlement prediction associated with the user identifier based on an entitlement model and at least one hierarchical level, the entitlement model defining a cluster representation of entitlement similarity, and wherein the entitlement prediction is based on one or more similarity relationships corresponding to the at least one hierarchical level;
  generating an attestation value to quantify the entitlement prediction relative to nodes of the cluster representation associated with the prior-identified access entitlements; wherein the entitlement prediction includes an indication, based on the attestation value, whether to propagate the access entitlement to provide access to the networked computing resource; and
  transmitting a signal representing the entitlement prediction for granting downstream access to a networked computing resource.

* * * * *